US011601276B2

(12) United States Patent
Etwaru et al.

(10) Patent No.: US 11,601,276 B2
(45) Date of Patent: Mar. 7, 2023

(54) INTEGRATING AND DETECTING VISUAL DATA SECURITY TOKEN IN DISPLAYED DATA VIA GRAPHICS PROCESSING CIRCUITRY USING A FRAME BUFFER

(71) Applicant: MOBEUS INDUSTRIES, INC., Sparta, NJ (US)

(72) Inventors: Dharmendra Etwaru, Sparta, NJ (US); Michael R. Sutcliff, Inlet Beach, FL (US)

(73) Assignee: MOBEUS INDUSTRIES, INC., Sparta, NJ (US)

( * ) Notice: Subject to any disclaimer, the term of this patent is extended or adjusted under 35 U.S.C. 154(b) by 0 days.

(21) Appl. No.: 17/675,919

(22) Filed: Feb. 18, 2022

(65) Prior Publication Data

US 2022/0353079 A1     Nov. 3, 2022

Related U.S. Application Data

(60) Provisional application No. 63/248,741, filed on Sep. 27, 2021, provisional application No. 63/182,391, filed on Apr. 30, 2021.

(51) Int. Cl.
*H04L 9/32*     (2006.01)
*G06T 1/20*     (2006.01)
(Continued)

(52) U.S. Cl.
CPC .............. *H04L 9/3213* (2013.01); *G06T 1/20* (2013.01); *H04L 9/3231* (2013.01); *H04N 19/186* (2014.11); *H04N 19/436* (2014.11)

(58) Field of Classification Search
CPC ............................ H04L 9/3213; H04L 9/3231
See application file for complete search history.

(56) References Cited

U.S. PATENT DOCUMENTS

| 7,013,428 | B1 | 3/2006 | Kamen |
| 8,813,154 | B1 | 8/2014 | Sivertsen |

(Continued)

OTHER PUBLICATIONS

International Search Report and Written Opinion of the International Searching Authority dated Nov. 23, 2021, in PCT/US21/46976, filed Aug. 20, 2021, 10 pages.

(Continued)

*Primary Examiner* — Jerry T Jean Baptiste
(74) *Attorney, Agent, or Firm* — Oblon, McClelland, Maier & Neustadt, L.L.P.

(57) ABSTRACT

An apparatus, method, and computer readable medium that include establishing a video connection between the apparatus and a first device, in response to establishing the video connection, transmitting a token to a second device equipped with a display, the token being displayed on the display of the second device, receiving visual data comprising the token displayed on the display of the second device, the visual data being generated by the first device, that includes a camera, capturing the token displayed on the display of the second device, accessing a frame buffer of a graphics processing unit (GPU), analyzing, in the frame buffer of the GPU, a frame representing a section of the visual data to detect the token, and in response to the token being detected in the visual data, generating an authentication to authenticate the video connection between the apparatus and the first device.

17 Claims, 19 Drawing Sheets

(51) Int. Cl.
*H04N 19/436* (2014.01)
*H04N 19/186* (2014.01)

(56) References Cited

U.S. PATENT DOCUMENTS

| | | |
|---|---|---|
| 9,325,809 B1 | 4/2016 | Barros et al. |
| 9,411,789 B1 | 8/2016 | Chitta |
| 9,792,895 B2 | 10/2017 | Khintsitskiy |
| 9,924,236 B2 | 3/2018 | Nguyen |
| 10,089,633 B2 | 10/2018 | Thiyagarajan |
| 10,236,006 B1 | 3/2019 | Gurijala et al. |
| 10,567,733 B2 | 2/2020 | Cole |
| 10,742,634 B1 | 8/2020 | Shahbazi et al. |
| 10,853,903 B1 | 12/2020 | Deshmukh |
| 11,064,149 B1 | 7/2021 | Paun |
| 2002/0056136 A1 | 5/2002 | Wistendahl et al. |
| 2003/0234790 A1 | 12/2003 | Hochmuth |
| 2004/0130552 A1 | 7/2004 | Duluk, Jr. et al. |
| 2005/0219241 A1 | 10/2005 | Chun |
| 2006/0242607 A1 | 10/2006 | Hudson |
| 2007/0009179 A1 | 1/2007 | Easwar |
| 2007/0156708 A1 | 7/2007 | Takayama |
| 2008/0066092 A1 | 3/2008 | Laude et al. |
| 2008/0137848 A1 | 6/2008 | Kocher et al. |
| 2008/0140714 A1 | 6/2008 | Rhoads et al. |
| 2008/0152016 A1 | 6/2008 | Nagahara |
| 2009/0245516 A1 | 10/2009 | Ravikiran |
| 2010/0153848 A1 | 6/2010 | Saha |
| 2011/0304646 A1 | 12/2011 | Kato |
| 2012/0032977 A1 | 2/2012 | Kim et al. |
| 2012/0088543 A1 | 4/2012 | Lindner et al. |
| 2012/0095958 A1 | 4/2012 | Pereira et al. |
| 2012/0114249 A1 | 5/2012 | Conwell |
| 2012/0169928 A1 | 7/2012 | Casagrande et al. |
| 2012/0207208 A1 | 8/2012 | Wyatt |
| 2012/0272279 A1 | 10/2012 | Lim |
| 2013/0044129 A1 | 2/2013 | Latta et al. |
| 2013/0047180 A1 | 2/2013 | Moon et al. |
| 2013/0183952 A1 | 7/2013 | Davis et al. |
| 2013/0294648 A1 | 11/2013 | Rhoads et al. |
| 2014/0172429 A1 | 6/2014 | Butcher et al. |
| 2014/0201769 A1 | 7/2014 | Neumeier et al. |
| 2014/0304316 A1 | 10/2014 | Thulasiraman et al. |
| 2015/0039993 A1 | 2/2015 | Ishimaru |
| 2015/0074735 A1 | 3/2015 | Herigstad et al. |
| 2015/0097850 A1 | 4/2015 | Craik et al. |
| 2015/0113557 A1 | 4/2015 | Kim |
| 2015/0163345 A1 | 6/2015 | Cornaby |
| 2015/0195288 A1 | 7/2015 | Hoyos et al. |
| 2015/0287220 A1 | 10/2015 | Jain et al. |
| 2015/0034141 A1 | 11/2015 | Schrempp |
| 2015/0319510 A1 | 11/2015 | Ould Dellahy, VIII et al. |
| 2015/0358525 A1 | 12/2015 | Lord |
| 2016/0109954 A1 | 4/2016 | Harris |
| 2016/0328871 A1 | 11/2016 | Chen |
| 2017/0026621 A1* | 1/2017 | Vellanki ................. H04N 7/186 |
| 2017/0052654 A1 | 2/2017 | Cervelli et al. |
| 2017/0155933 A1 | 6/2017 | Del Strother |
| 2017/0185251 A1 | 6/2017 | Jain |
| 2017/0195753 A1 | 7/2017 | Dakss |
| 2017/0255614 A1 | 9/2017 | Vukosavljevic et al. |
| 2017/0278289 A1 | 9/2017 | Marino et al. |
| 2017/0304725 A1 | 10/2017 | Perlman et al. |
| 2017/0344552 A1 | 11/2017 | Golbandi |
| 2018/0004204 A1 | 1/2018 | Rider |
| 2018/0046602 A1 | 2/2018 | Sisson |
| 2018/0096502 A1 | 4/2018 | Kansara |
| 2018/0122114 A1 | 5/2018 | Luan et al. |
| 2018/0124370 A1 | 5/2018 | Bejot |
| 2018/0143950 A1 | 5/2018 | Al-Arnaouti et al. |
| 2018/0150696 A1 | 5/2018 | Li |
| 2018/0189922 A1 | 7/2018 | Chinnadurai et al. |
| 2018/0219814 A1 | 8/2018 | Maarek |
| 2018/0307846 A1 | 10/2018 | Hertling et al. |
| 2018/0308257 A1 | 10/2018 | Boyce |
| 2018/0343481 A1 | 11/2018 | Loheide et al. |
| 2019/0065152 A1 | 2/2019 | Jaroch |
| 2019/0206113 A1 | 7/2019 | Kipp et al. |
| 2019/0207885 A1 | 7/2019 | Kozhemiak et al. |
| 2019/0213625 A1 | 7/2019 | Bhattacharjee |
| 2019/0236816 A1 | 8/2019 | Wang et al. |
| 2019/0259124 A1 | 8/2019 | Barnett |
| 2019/0295208 A1 | 9/2019 | Hoatry |
| 2019/0317763 A1 | 10/2019 | Sakamoto et al. |
| 2019/0332883 A1 | 10/2019 | Ivanovic |
| 2019/0335233 A1 | 10/2019 | Harvey |
| 2020/0110482 A1* | 4/2020 | Vu ........................... H04L 9/38 |
| 2020/0162788 A1 | 5/2020 | Cremer |
| 2020/0169736 A1 | 5/2020 | Petajan |
| 2020/0184658 A1 | 6/2020 | Cui |
| 2020/0245021 A1 | 7/2020 | Kitazato |
| 2020/0257920 A1 | 8/2020 | Kumar et al. |
| 2020/0273251 A1 | 8/2020 | Palos et al. |
| 2020/0389293 A1 | 12/2020 | Lambert et al. |
| 2020/0396521 A1 | 12/2020 | Weiner et al. |
| 2021/0004650 A1 | 1/2021 | Frank |
| 2021/0168416 A1 | 6/2021 | Weiner |
| 2021/0192302 A1 | 6/2021 | Wang |
| 2021/0200501 A1 | 7/2021 | Stankoulov |
| 2021/0344991 A1 | 11/2021 | Todd |
| 2022/0019780 A1 | 1/2022 | Ozserin et al. |
| 2022/0067415 A1 | 3/2022 | Kerofsky |
| 2022/0105193 A1 | 4/2022 | Li et al. |
| 2022/0114584 A1* | 4/2022 | Conley ............. G06Q 20/3674 |
| 2022/0138994 A1 | 5/2022 | Viswanathan et al. |

OTHER PUBLICATIONS

International Search Report and Written Opinion of the International Searching Authority dated Jun. 1, 2022, in PCT/US22/20244, filed Mar. 14, 2022, 12 pages.

International Search Report and Written Opinion of the International Searching Authority dated Jun. 9, 2022, in PCT/US22/20226, filed Mar. 14, 2022, 12 pages.

International Search Report and Written Opinion of the International Searching Authority dated Jun. 9, 2022, in PCT/US22/20234, filed Mar. 14, 2022, 8 pages.

International Search Report and Written Opinion of the International Searching Authority dated Jun. 9, 2022, in PCT/US22/20184, filed Mar. 14, 2022, 8 pages.

International Search Report and Written Opinion of the International Searching Authority dated Jun. 3, 2022, in PCT/US2022/020254, filed Mar. 14, 2022, 13 pages.

International Search Report and Written Opinion of the International Searching Authority dated Jun. 7, 2022, in PCT/US2022/022840, filed Mar. 31, 2022, 8 pages.

International Search Report and Written Opinion of the International Searching Authority dated Jul. 20, 2022, in PCT/US22/20263, filed Mar. 14, 2022, 9 pages.

International Search Report and Written Opinion of the International Searching Authority dated Aug. 3, 2022, in PCT/US22/20215, filed Mar. 14, 2022, 10 pages.

International Search Report and Written Opinion of the International Searching Authority dated Aug. 1, 2022, in PCT/US22/20267, filed Mar. 14, 2022, 12 pages.

International Search Report and Written Opinion of the International Searching Authority dated Jul. 7, 2022, in PCT/US22/20258, filed Mar. 14, 2022, 9 pages.

Demuynck et al., 'Magic Cards: A New Augmented-Reality Approach', IEEE Computer Graphics and Applications, pp. 12-19. (Year: 2013).

Oh et al., 'CAMAR: Context-aware Mobile Augmented Reality in Smart Space', IWUVR, pp. 48-51. (Year: 2009).

\* cited by examiner

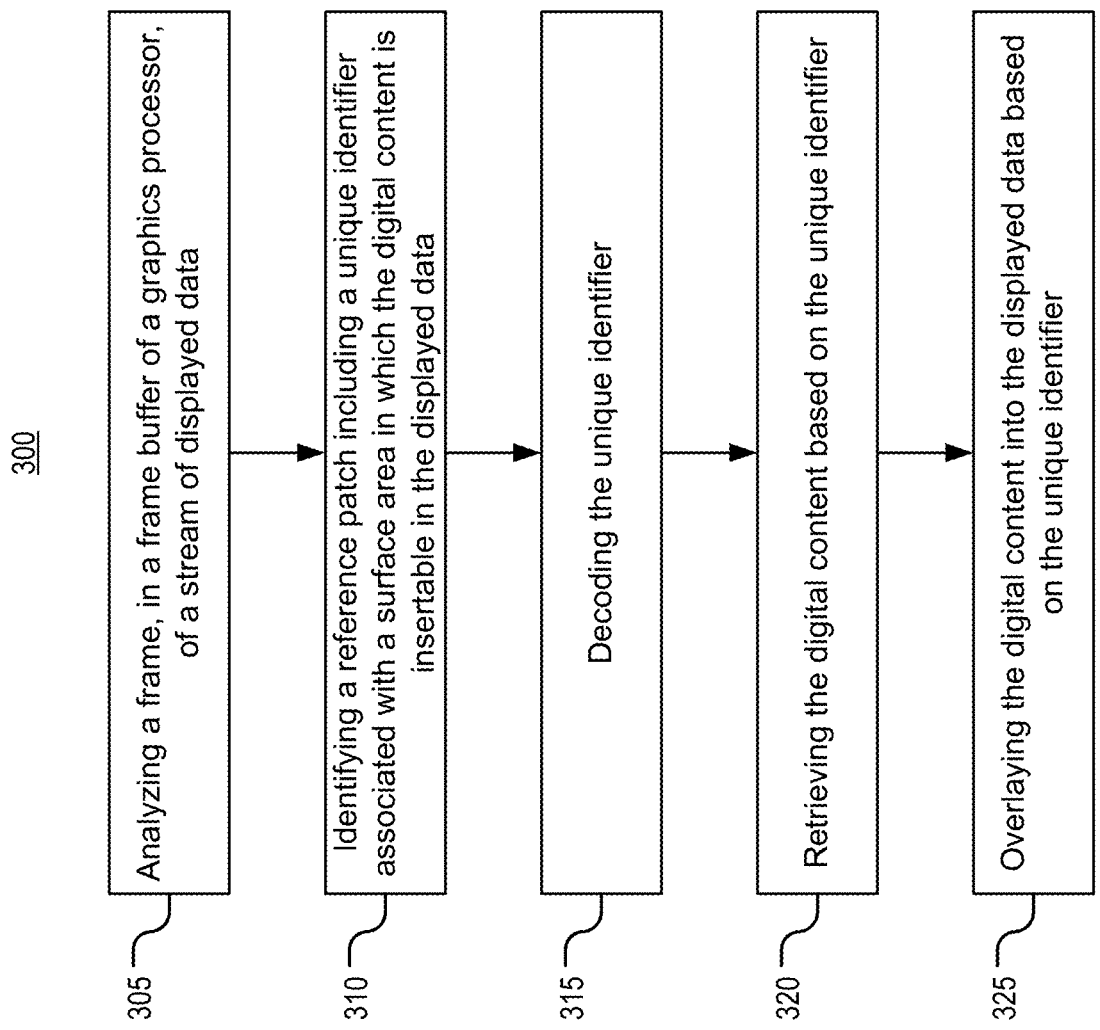

INTEGRATING AND DETECTING VISUAL DATA SECURITY TOKEN IN DISPLAYED DATA VIA GRAPHICS PROCESSING CIRCUITRY USING A FRAME BUFFER

CROSS-REFERENCE TO RELATED APPLICATIONS

The present application claims priority to U.S. Provisional Application No. 63/248,741, filed Sep. 27, 2021, and U.S. Provisional Application No. 63/182,391, filed Apr. 30, 2021, the entire content of each of which is incorporated by reference herein in its entirety for all purposes.

BACKGROUND

Field of the Disclosure

The present disclosure relates to a method, device, and computer-readable medium of multifactor authentication which involves the use of visual data.

Description of the Related Art

The confirmation of identity or "authentication" of a user is achieved through factors of authentication. A factor of authentication refers to information which provides evidence that the user is who he or she claims to be. Typically, things such as passwords or PINs are used as factors of authentication. Recently, two-factor authentication has become increasingly advantageous as the insecurity of using only a password has become evident.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

According to an embodiment, the present disclosure relates to an apparatus for providing multifactor authentication of user identity, one factor of which comprises visual data. The apparatus comprises processing circuitry, including a graphics processing unit (GPU), configured to establish a video connection between the apparatus and a first device, the first device associated with a user, in response to establishing the video connection, transmit a token to a second device equipped with a display, the second device also associated with the user, the token being displayed on the display of the second device, receive visual data comprising the token displayed on the display of the second device, the visual data being generated by the first device, that includes a camera, capturing the token displayed on the display of the second device, access a frame buffer of the GPU, analyze, in the frame buffer of the GPU, a frame representing a section of the visual data to detect the token, and in response to the token being detected in the visual data, generate an authentication to authenticate the video connection between the apparatus and the first device.

According to an embodiment, the present disclosure relates to a method for providing multifactor authentication of user identity, one factor of which comprises visual data. The method involves establishing a video connection between an apparatus and a first device, the first device associated with a user, in response to establishing the video connection, transmitting a token to a second device equipped with a display, the second device also associated with the user, the token being displayed on the display of the second device, receiving visual data comprising the token displayed on the display of the second device, the visual data being generated by the first device, that includes a camera, capturing the token displayed on the display of the second device, accessing a frame buffer of a graphics processing unit (GPU), analyzing, in the frame buffer of the GPU, a frame representing a section of the visual data to detect the token, and in response to the token being detected in the visual data, generating an authentication to authenticate the video connection between the apparatus and the first device.

According to an embodiment, the present disclosure relates to a computer readable medium for storing computer-readable instructions that, when executed by a computer, cause the computer to perform a method for providing multifactor authentication of user identity, one factor of which comprises visual data. The method involves establishing a video connection between an apparatus and a first device, the first device associated with a user, in response to establishing the video connection, transmitting a token to a second device equipped with a display, the second device also associated with the user, the token being displayed on the display of the second device, receiving visual data comprising the token displayed on the display of the second device, the visual data being generated by the first device, that includes a camera, capturing the token displayed on the display of the second device, accessing a frame buffer of a graphics processing unit (GPU), analyzing, in the frame buffer of the GPU, a frame representing a section of the visual data to detect the token, and in response to the token being detected in the visual data, generating an authentication to authenticate the video connection between the apparatus and the first device.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3A is a flow chart for a method of inspecting the reference patch, according to an exemplary embodiment of the present disclosure.

DETAILED DESCRIPTION

Figure 1:
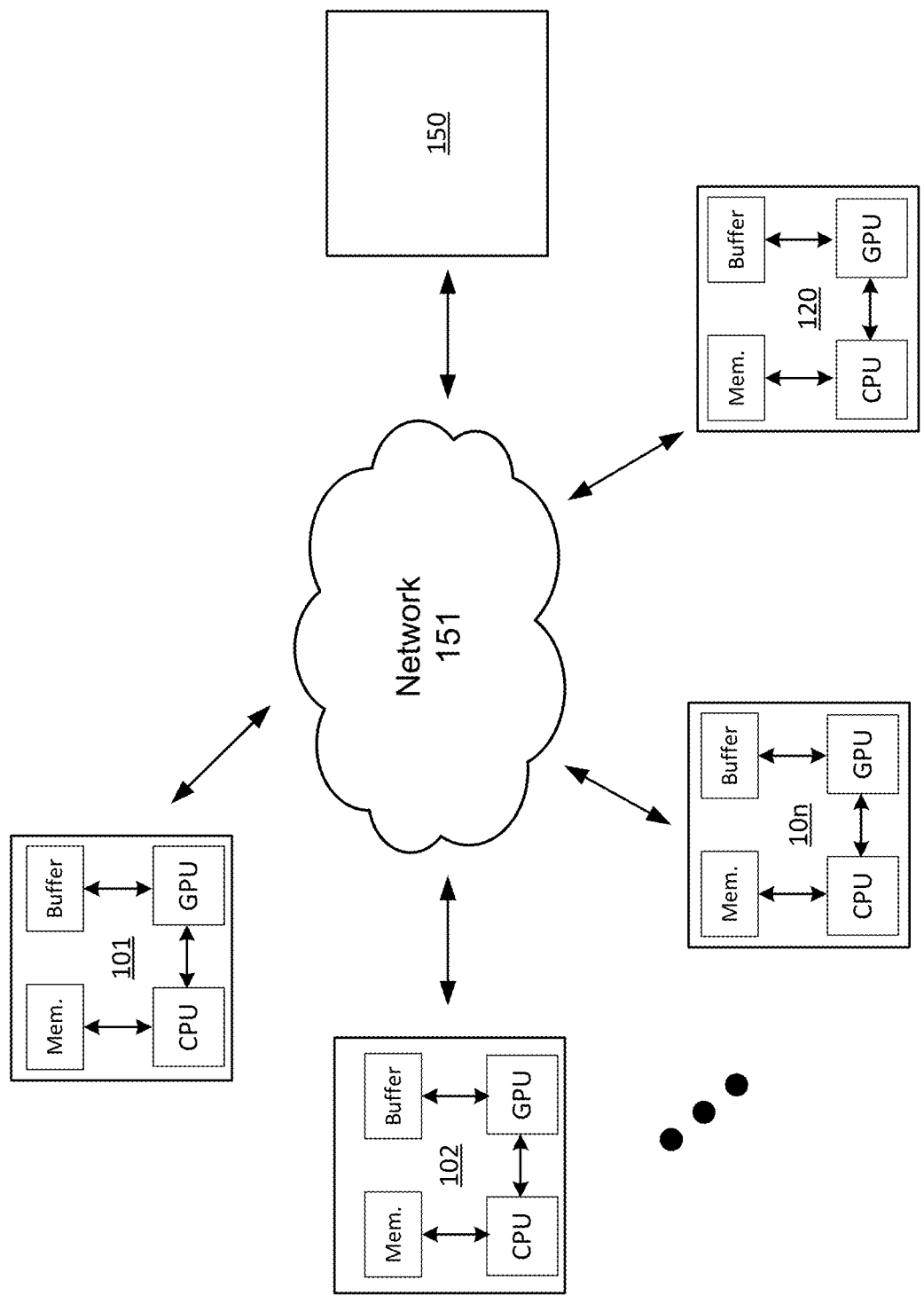
FIG. 1 is a schematic view of user devices communicatively connected to a server, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics can be combined in any suitable manner in one or more embodiments without limitation.

According to an embodiment, the present disclosure relates to secure transfer of information from a first user to another user (or users) via two or more electronic devices. The secure transfer comprises the confirmation of the identity of the first user/party and/or the other user/party. The confirmation of identity involves multifactor authentication in which at least one factor comprises visual data collected by one of the electronic devices. This visual data can contain information which is useful in confirming the identity of the party. The electronic device(s) can be a mobile device such as a smartphone, tablet, and the like, a portable computer such as a laptop, a desktop computer, or the like.

Authentication refers to the process of establishing user identities electronically presented to an information system such as a processing/electronic device or collection of processing/electronic devices. In the following, reference is made to two distinct roles. An "authenticator" refers to a user, party, or other entity which is attempting to confirm the identity of an "authenticatee". The "authenticatee" is a separate user, party, or other entity whose identity is being confirmed by the authenticator as part of the authentication. Authentication can be a one-way action, for example, with the identity of the authenticator not in question. Authentication can be a reciprocal action, for example, where both users, parties, or other entities confirm each other's identities. In such a case, each can act as an authenticator and an authenticatee. An authentication may occur directly from authenticator to authenticate or may involve the use or action of a third user, party, or entity. Typically, authentication is intended to distinguish or to be able to distinguish a genuine entity from an impostor claiming to be that entity. Some authentication uses probability to make such a distinguishment. A measure of the certainty that the identity of the authenticatee can be referred to as a "confidence" of the authentication.

Authentication is typically achieved through factors of authentication. A factor of authentication refers to information which provides evidence that the authenticatee is who he or she claims to be. Such information typically takes one of the following forms: something the user HAS, something the user KNOWS, something the user IS, something the user DOES, or somewhere the user is LOCATED.

Things the user has (also referred to as "possession factors") refer to physical or digital objects that the user has in his or her possession. The fact that a user has the object in his or her possession is confirmed by the authenticator by some appropriate method. For example, a lock confirms identity by possession of a key. A bank can grant access to a safety deposit box to anyone in possession of the associated key. In another example, the identity of a member of a society can be confirmed by the possession of a piece of jewelry such as a pin or ring or a membership card. In another example, possession of a decoder ring can be used to confirm identity. A coded message can be sent to the authenticatee by an authenticator who knows the decoded message. Only a person in possession of the decoder ring can decode the coded message, the contents of which (i.e. the decoded message) can be used to confirm the possession of the decoder ring to the authenticator.

Things the user knows (also referred to as "knowledge factors") refer to information that the entity the authenticatee claims to be would know. Examples of such information include passwords, personal identification numbers (PINs), social security number, driver's license number, or other personal information such as mother's maiden name, first pet's name, childhood street name, favorite color, spouse meeting place, and the like. In one embodiment, such information would be selected such that only the entity the authenticatee claims to be would know. Common knowledge or easily discovered knowledge, while able to fulfill the functions of authentication, is not preferred as such information does not provide the authenticator with a high degree of confidence in the authentication. For example, a person's birthday is almost assuredly known by that person, but could easily be discovered from a myriad of sources by an impostor, including public governmental records or social media. Thus, birthdate does not provide information useful in distinguishing a genuine user from an impostor.

Things the user is (also known as "inherence factors" or "biometric factors") refer to measurable characteristics a user possess as part of the user's physical form. Examples of such characteristics include retinal pattern, iris pattern, fingerprint, voiceprint, palm vein pattern, facial recognition, and DNA. Such biometric factors relating to the physical characteristics of a user are occasionally referred to as "physical biometrics". Typically, biometric factors are detected, measured, recorded, or otherwise determined through the use of specialized biometric devices. Examples of such devices include iris scanners, retinal scanners, and fingerprint readers. These specialized biometric devices can be a component of an electronic device (e.g. laptop with integrated fingerprint reader) or can be a separate device.

Things the user does (also known as "behavioral factors") refer to measurable characteristics of actions performed by a user. Examples of such characteristics include, but are not limited to signature, typing rhythm, gait, keystroke, vocal or speech patterns, navigational patterns, screen pressure, mouse movement, scrolling patterns, engagement patterns, and gyroscope position. In the context of electronic devices, a user tends to develop patterns in the characteristics of how he or she uses the electronic device. The detection and analysis of such patterns can be performed by the electronic device itself or another device. Tracking, tabulating, or logging of device usage characteristics can be a necessary component of determining certain behavior factors. Such logging may be performed by an electronic device itself or another device. Behavioral factors such as these are sometimes referred to as "behavioral biometrics" and are grouped in with physical biometrics under the more general umbrella term "biometrics".

Somewhere the user is located (also referred to as "location factors") refers to the detection of a user's presence at a distinct location. For example, a computer only accessible from a restricted area such as a military base or research laboratory can have a location factor. The fact that the user is accessing that computer provides authentication based on the location of that computer. In another example, location can be determined by device connectivity such as IP address, cellphone tower tracking, or GPS location determination. A location factor can also be determined by observation of the authenticatee and/or a specific location. Video footage of the authenticatee taken from a known location, for example from a security camera, can place the authenticatee in that specific known location. Video footage of an authenticatee from a known device, for example the authenticatee's laptop webcam or mobile device camera, can provide a location factor using the background of the video footage. The presence of the Eiffel tower visible from the authenticatee's webcam, for example, provides strong evidence the authenticatee is in Paris. If the authenticatee is expected to be in Paris, this provides identity confirmation. If the authenticatee is expected to be in Tokyo, this provides identity disconfirmation.

More than one factor can be determined at the same time or with a single measurement, determination, or recording. For example, with an audio recording of a user speaking a passphrase, a knowledge factor (the passphrase itself), a biometric factor (the frequency distribution of the user's voice), and a behavioral factor (the intonation, inflection, tempo, and rhythm of the user speaking the passphrase) can be determined. In a related example, if the passphrase was delivered to the user using a physical or digital means, the audio recording can also determine a knowledge or possession factor.

While extracting or obtaining multiple factors from a single information source (such as the audio file above) is possible, it can be disadvantageous to do so. It can be advantageous to obtain factors from multiple sources. It can be further advantageous for these multiple sources to be separate electronic devices. Each of these separate electronic devices, for example, can each collect data to be used for authentication. The separate electronic devices can collect the same type of data (e.g. audio, video, still image, password, fingerprint scan, etc.) or different types of data.

User identity can be modeled mathematically using probability. Such a mathematical model can be succinctly described as providing an answer to the question "what are the chances that this user is who he or she claim to be?" The answer to that question can be provided in the form of a probability, odds, likelihood, or other similar statistical characterization. Authentication, as described above, can provide evidence to increase or decrease these statistical characterizations. This statistical characterization can be the confidence of the authentication. An authentication factor can raise the probability that a user is who they claim to be. For example, take a website that requires a password. The correct entry of the password is not a strict guarantee that the user is who he or she claims to be. The user may have told another person the password. The password may have been obtained illicitly from another source (e.g. hacked from a database). Another person may have guessed the password.

In such a mathematical model of user identity, different factors can be described by a weight or a value which is related to the impact on the statistical characterization. High-value factors provide evidence which drastically changes the statistical characterization while low-value factors provide evidence which makes little to no impact on the statistical characterization. For example, fingerprints or iris patterns can be considered high-value factors. Fingerprints and iris patterns have a high degree of uniqueness to an individual. Further, fingerprints and iris patterns are difficult to create artificially to fool a dedicated fingerprint scanner or iris pattern scanner. Conversely, a three-digit code (common on certain padlocks) for example, can be considered a low-value factor. A three-digit code has a maximum of 1000 possible combinations (10 for the first digit, multiplied by 10 for the second digit, multiplied by 10 for the third digit) so the chances that an impostor could guess the code or even try all 1000 possible codes means that the correct code is not strong evidence of identity for authentication.

A mathematical model of user identity can benefit from multiple factors. The use of multiple factors can be advantageous compared to a single authentication factor. For example, the value of two or more factors can be combined to provide an additive or more-than-additive effect on the confidence of the authentication. The two or more factors can be the same type of factor (e.g. two passwords) or can be different types of factors (e.g. pin and facial recognition).

Complex, serious, or legally-binding interactions (which can be referred to as "high-stakes interactions"), are often performed in real-time and can involve live interaction between entities. For example, opening an account or credit card at a bank is something which can have serious implications. Conducting the opening via an interaction happening by or through electronic devices is clearly a high-stakes interaction. It can be advantageous to conduct the opening via a live, real-time interaction such as a video- and audio-enabled teleconference.

Described herein are an apparatus, a method, and a non-transitory computer readable medium for storing computer-readable instructions for performing a method of multifactor authentication in which at least one factor comprises visual data.

Referring now to the figures, FIG. 1 is a schematic view of an apparatus/electronic device, such as a client/user device (a first device 101) communicatively connected, via a network 151, to a second electronic device, such as a server (a second device 150), and a generating device 120, according to an embodiment of the present disclosure. Further, in an embodiment, additional client/user devices can be communicatively connected to both the first device 101 and the second device 150. A second client/user device (a third device 102) can be communicatively connected to the first device 101, the second device 150, and the generating device 120. As shown, a plurality of the client/user devices can be communicatively connected to, for example, an Nth user device 10n.

An application can be installed or accessible on the first device 101 for executing the methods described herein. The application can also be integrated into the operating system (OS) of the first device 101. The first device 101 can be any electronic device such as, but not limited to, a personal computer, a tablet pc, a smart-phone, a smart-watch, an integrated AR/VR (Augmented Reality/Virtual Reality) headwear with the necessary computing and computer vision components installed (e.g., a central processing unit (CPU), a graphics processing unit (GPU), integrated graphics on the CPU, etc.), a smart-television, an interactive screen, a smart projector or a projected platform, an IoT (Internet of things) device or the like.

Figure 8:
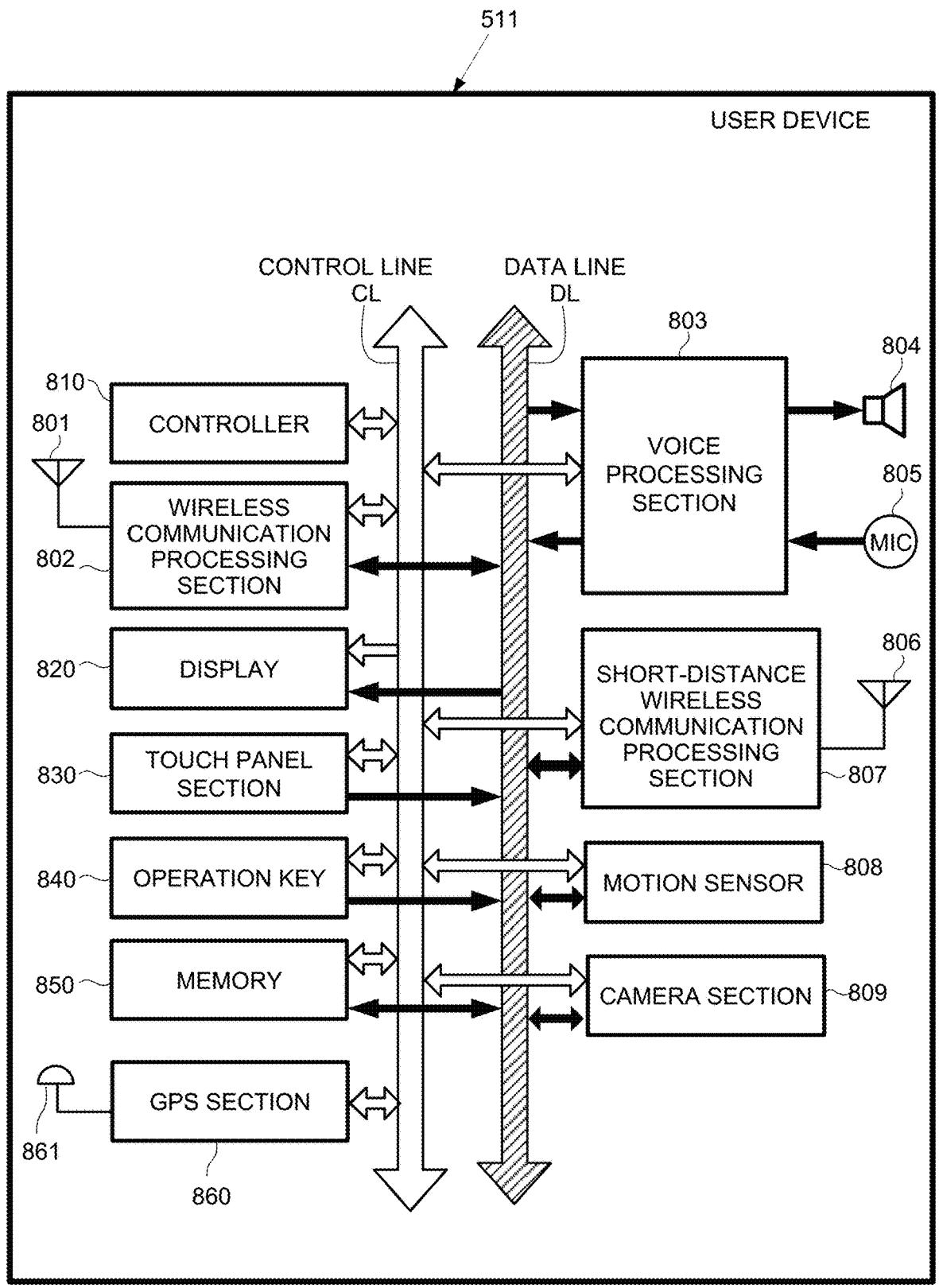
FIG. 8 is a schematic of a user device for performing a method, according to an exemplary embodiment of the present disclosure.
Figure 9:
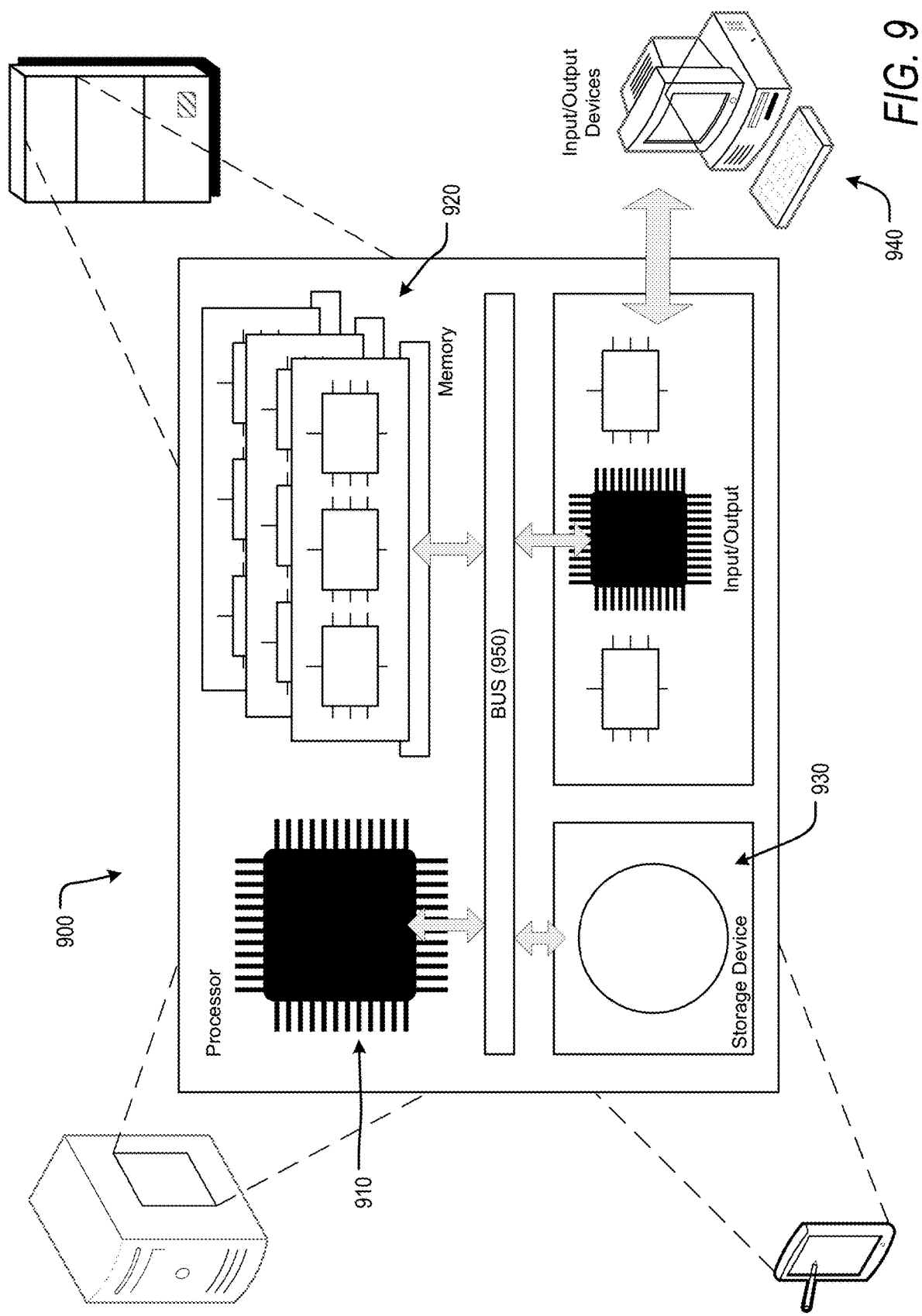
FIG. 9 is a schematic of a hardware system for performing a method, according to an exemplary embodiment of the present disclosure.
Figure 10:
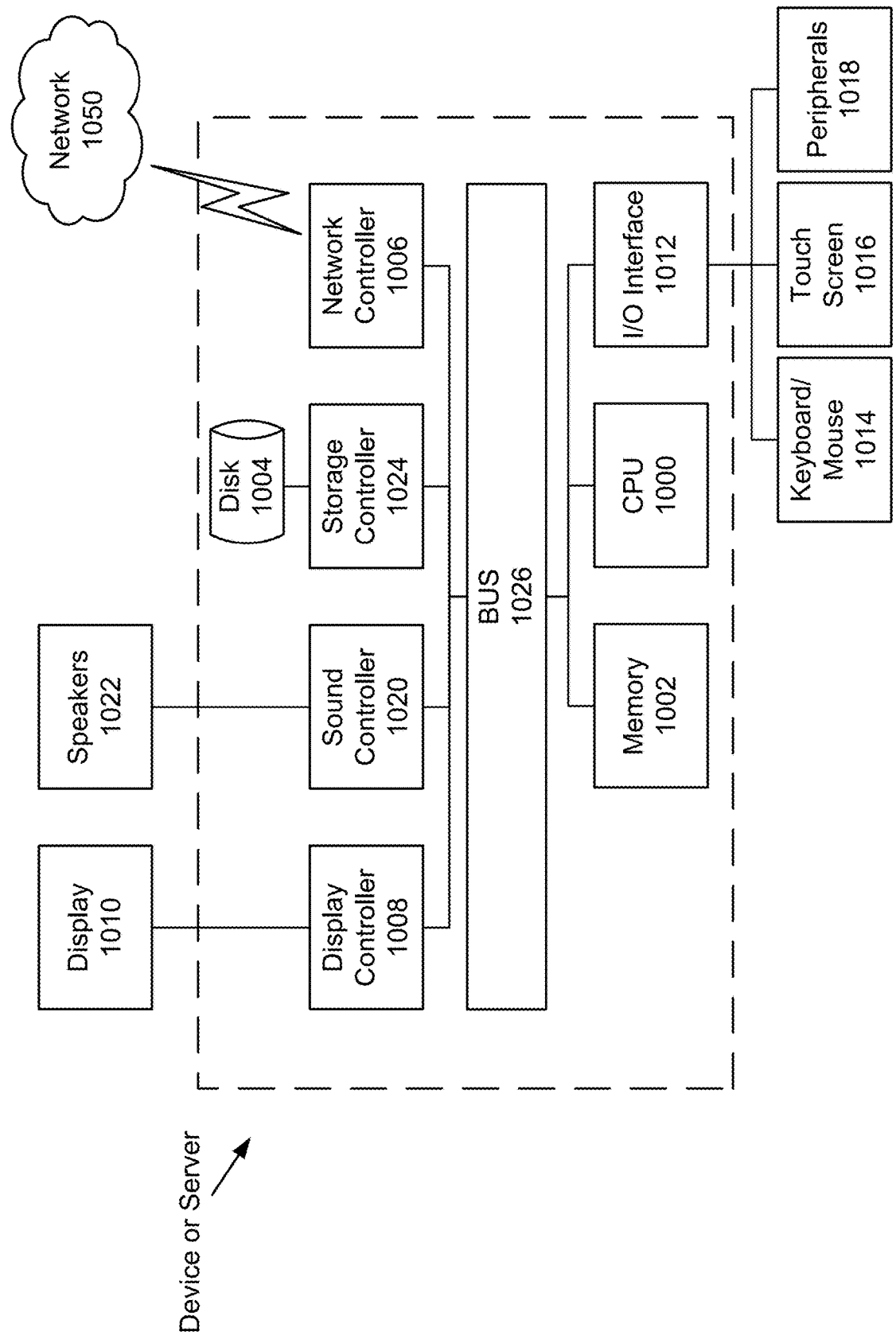
FIG. 10 is a schematic of a hardware configuration of a device for performing a method, according to an exemplary embodiment of the present disclosure.

As illustrated in FIG. 1, the first device 101 includes a CPU, a GPU, a main memory, and a frame buffer, among other components (discussed in more detail in FIGS. 8-10). In an embodiment, the first device 101 can call graphics that are displayed on a display. The graphics of the first device 101 can be processed by the GPU and rendered in scenes stored on the frame buffer that is coupled to the display. In an embodiment, the first device 101 can run software applications or programs that are displayed on a display. In order for the software applications to be executed by the CPU, they can be loaded into the main memory, which can be faster than a secondary storage, such as a hard disk drive or a solid state drive, in terms of access time. The main memory can be, for example, random access memory (RAM) and is physical memory that is the primary internal memory for the first device 101. The CPU can have an associated CPU memory and the GPU can have an associated video or GPU memory. The frame buffer may be an allocated area of the video memory. The GPU can display the displayed data pertaining to the software applications. It can be understood that the CPU may have multiple cores or may itself be one of multiple processing cores in the first device 101. The CPU can execute commands in a CPU programming language such as C++. The GPU can execute commands in a GPU programming language such as HLSL. The GPU may also include multiple cores that are specialized for graphic processing tasks. Although the above description was discussed with respect to the first device 101, it is to be understood that the same description applies to the other devices (101, 102, 10n, and 120) of FIG. 1. Although not illustrated in FIG. 1, the second device 150 can also include a CPU, GPU, main memory, and frame buffer.

Figure 2A:
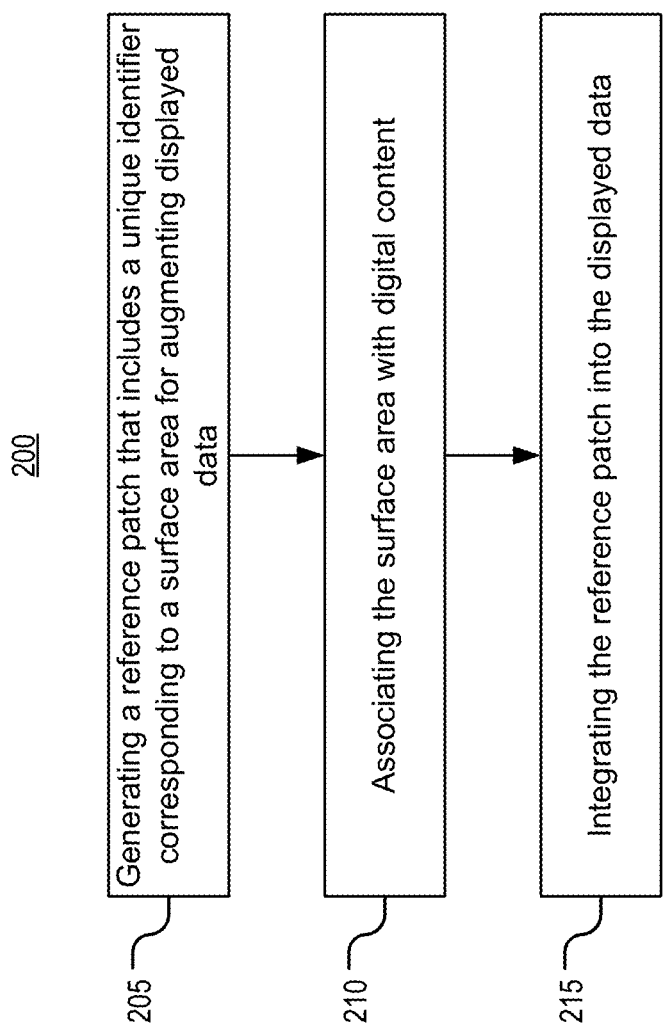
FIG. 2A is a flow chart for a method of generating a reference patch and embedding the reference patch into displayed data, according to an exemplary embodiment of the present disclosure.

FIG. 2A is a flow chart for a method 200 of generating a reference patch and embedding the reference patch into displayed data, according to an embodiment of the present disclosure. The present disclosure describes generation of the reference patch and embedding of this patch into the displayed data content in order to integrate additional content on the first device 101. In an embodiment, the first device 101 can incorporate digital content into what is already being displayed (displayed data) for a more immersive experience.

In this regard, the first device 101 can generate the reference patch in step 205. The reference patch can be an object having an area and shape that is embedded in the displayed data at a predetermined location in the displayed data. For example, the reference patch can be a square overlayed and disposed in a corner of a digital document (an example of displayed data), wherein the reference patch can be fixed to a predetermined page for a multi-page (or multi-slide) digital document. The reference patch can thus also represent a region of interest in the digital document. The reference patch can be an object that, when not in a field of view of the user, is inactive. The reference patch can, upon entering the field of view of the user, become active. For example, the reference patch can become active when detected by the first device 101 in the displayed data. When active, the reference patch can retrieve digital content and augment the displayed data by incorporating the retrieved digital content into the displayed data. Alternatively, the reference patch can become active when being initially located within the frame of the screen outputting the displayed data. For example, even if another window or popup is placed over top of the reference patch, the reference patch may continue to be active so long as the reference patch remains in the same location after detection and the window including the document incorporating the reference patch is not minimized or closed. As will be described further below, the reference patch can have a predetermined design that can be read by the first device 101, leading to the retrieval and displaying of the digital content.

In an embodiment, the first device 101 can use a geometrical shape for the reference patch for placement into any displayed data using applications executed in the first device 101. The reference patch can take any shape such as a circle, square, rectangle or any arbitrary shape. In step 210, the reference patch can also have predetermined areas within its shape for including predetermined data. The predetermined data can be, for example, unique identifiers that correspond to a surface area of the displayed data. The unique identifiers can be, for example, a marker. As will be described below, the marker can take the form of patterns, shapes, pixel arrangements, pixel luma, and pixel chroma, among others. The surface area, by way of the unique identifiers, can be associated with predetermined digital content that is recalled and displayed at the corresponding surface area in the displayed data. The unique identifier can include encoded data that identifies the digital content, a location address of the digital content at the second device 150 (see description below), a screen position within the surface area at which the digital content is insertable in the displayed data, and a size of the digital content when inserted in the displayed data (adjustable before being displayed).

That is, in an embodiment, the surface area (or an available area in which digital content is insertable/to be inserted) of the displayed data can be portion(s) of the displayed data that do not include objects that might obscure the reference patch or the digital content displayed at the corresponding surface area in the displayed data. For example, the first device 101 can use computer vision (described below) to detect the objects. For example, the first device 101 can inspect an array to determine locations of the objects. For example, a slide in a slide deck can include text, pictures, logos, and other media, and the surface area can be the blank space or spaces around the aforementioned objects. Thus, the digital content can be displayed somewhere in the blank spaces. In an embodiment, the surface area of the displayed data can include portions of the displayed data that already include objects and the digital content can be displayed at the same location as the objects. For example, a slide in a slide deck can include a picture of a user, and the reference patch can be the area representing a face of the user and the digital content can be displayed at the same location as a body of the user. For example, a slide in a slide deck can include an image of a vehicle and the reference patch can be disposed in a blank space of the displayed data, while the digital content retrieved (e.g., a new car paint color and new rims) can be displayed over the image of the vehicle. In other words, the digital content may be placed in a blank area of the displayed data and/or in an area that is not blank (i.e., an area that includes text, image(s), video(s), etc.).

In step 215, the first device 101 can embed the reference patch into the displayed data, such as a word processing document file (i.e., DOC/DOCX) provided by e.g., Microsoft® Word, in a Portable Document Format (PDF) file such as the ones used by Adobe Acrobat®, in a Microsoft® PowerPoint presentation (PPT/PPTX), or in a video sequence file such as MPEG, MOV, AVI or the like. These file formats are illustrative of some file types which a user may be familiar with; however, applications included in the first device 101 are not limited to these types and other applications and their associated file types are possible.

The reference patch (or similar element) can be embedded into any displayed data, where the displayed data may be generated by an application running on or being executed by the first device 101. The reference patch can encompass the whole area designated by the displayed data, or just a portion of the area designated by the displayed data. The method of generating the reference patch and embedding the reference patch into the displayed data has been described as being performed by the first device 101, however, the second device 150 can instead perform the same functions. In order to be detected in the displayed data on the first device 101, the reference patch may only be simply displayed as an image on the screen. The reference patch may also simply be a raster image or in the background of an image. The reference patch is also able to be read even when the image containing the reference patch is low resolution. Because the reference patch is encoded in a hardy and enduring manner such that even if a portion of the reference patch is corrupted or undecipherable, the reference patch can still be activated and used.

In an embodiment, the reference patch can be embedded inside of a body of an email correspondence. The user can use any electronic mail application such as Microsoft Outlook®, Gmail®, Yahoo®, etcetera. As the application is running on the first device 101, it allows the user to interact with other applications. In an embodiment, the reference patch can be embedded on a video streaming or two-way communication interface such as a Skype® video call or a Zoom® video call, among others. In an embodiment, the reference patch can be embedded in displayed data for multi-party communication on a live streaming interface such as Twitch®.

One way in which the first device 101 may embed the reference patch into the displayed data is by arranging the generated reference patch in the displayed data such as in a desired document or other media. The reference patch may include a facade of the digital content which becomes an integrated part of the displayed data. The facade can act as a visual preview to inform the user of the digital content linked to the reference patch. The facade can include, for example, a screenshot of a video to be played, a logo, an animation, or an image thumbnail, among others. The facade can be a design overlay. The design overlay can be a picture that represents the underlying digital content superimposed over the reference patch. In an embodiment, the facade can indicate the content that is represented by the reference patch. The facade can be contained within the shape of the reference patch or have a dynamic size. For example, attention of the user can be brought to the facade by adjusting the size of the facade when the reference patch is displayed on the display. The adjustment of the size of the facade can also be dynamic, wherein the facade can enlarge and shrink multiple times. By the same token, a position and rotation of the facade can also be adjusted to produce a shaking or spinning effect, for instance.

Unlike traditional means of sending displayed data, the first device 101 may not send the whole digital content with a header file (metadata) and a payload (data). Instead, the reference patch that may include a facade of the underlying digital content is placed within the displayed data. If a facade is used, it indicates to the first device 101 that the surface area can have digital content that can be accessed with selection (clicking with a mouse, touchpad, eye-gaze, eye-blinks, or via voice-command) of the facade. The digital content can also be accessed or activated automatically, e.g., when the user has the reference patch displayed on the display of the first device 101. Other symbolic means of visualization can be employed to indicate to the user that the surface area is likely to include information for obtaining digital content. For example, a highlighting effect can be applied along a perimeter of the reference patch in a pulsating pattern of highlighting intensity to bring attention to the presence of the reference patch. For example, a series of spaced dashes surrounding the reference patch and oriented perpendicular to the perimeter of the reference patch can appear and disappear to provide a flashing effect. Other means can be employed to indicate to the user that the surface area is likely to include information for obtaining digital content, such as an audio cue.

The first device 101 employs further processes before embedding the reference patch into the displayed data. These processes and schemas are further discussed in FIG. 2B.

Figure 2B:
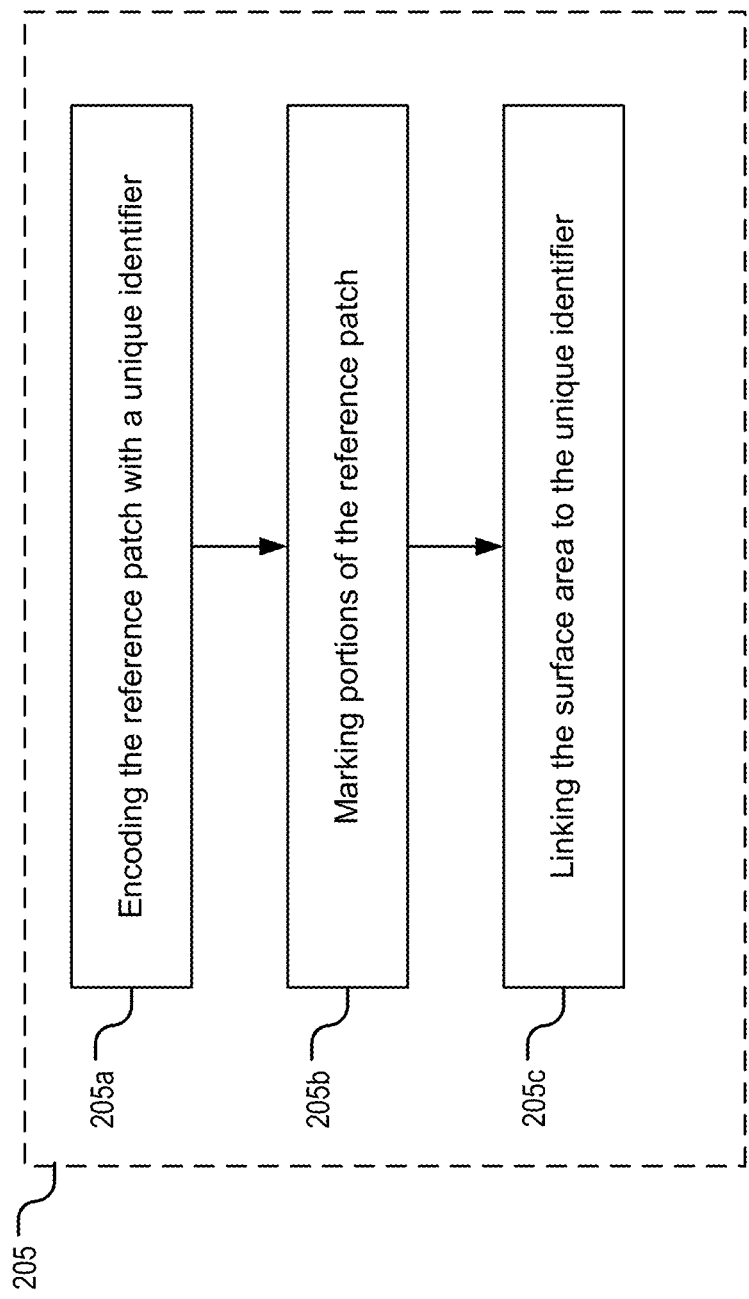
FIG. 2B is a flow chart of a sub-method of generating the reference patch, according to an exemplary embodiment of the present disclosure.

FIG. 2B is a flow chart of a sub-method of generating the reference patch, according to an embodiment of the present disclosure. The first device 101 can associate the digital content with the surface area corresponding to the reference patch (e.g., via the unique identifiers included therein) generated by the first device 101. In an embodiment, the surface area may encompass the whole of the displayed data or a portion of it.

The reference patch, which includes the unique identifiers corresponding to the surface area associated with the digital content, is then embedded into the displayed data by the first device 101. In some use cases, the displayed data including the reference patch can be sent or transmitted to a second user having the third device 102 including the same application, which then allows the second user to access information within the surface area and obtain the digital content and have it viewable on the third device 102. That is, the third device 102 can have the same displayed data overlaid with the augmenting digital content on the surface area of the display of the third device 102 in the location or locations defined by the reference patch.

In FIG. 2B, the generating device 120 uses additional processes to effectuate generation of the reference patch which is obtained and embedded by the first device 101. In an embodiment, the generating device 120 encodes the reference patch with the unique identifiers corresponding to the surface area in step 205a. The generating device 120 can mark areas of the reference patch in step 205b to form the marker that, either separately or in combination, define or may be used to access the unique identifiers. The marker can take the form of patterns, shapes, pixel arrangements, or the like. In an example, the marker can have a shape that corresponds to the shape of the surface area. In an example, the marker can have a size that corresponds to the size of the surface area. In an example, the marker can have a perimeter that corresponds to the perimeter of the surface area. The marker can use any feasible schema to provide identifying information that corresponds to the surface area within parts of the displayed data. In an embodiment, the marker can incorporate hidden watermarks that are only detectable by the first device 101 and the third device 102, which have detection functionality implemented therein, for example having the application installed or the functionality built into the operating system.

The marker can incorporate patterns which can then be extracted by the first device 101. In an example, the first device 101 can perform the embedding, then send the digital content having the embedded reference patch to the third device 102. The encoding is performed by the generating device 120 and may use any variety of encoding technologies such as the ARUCO algorithm to encode the reference patch by marking the reference patch with the marker. The first device 101 may also be used as the generating device 120.

In an embodiment, the marker can be comprised of a set of points, equidistant from each other and/or some angle apart from a reference point, such as the center of the reference patch or represent some other fiducial points. That is, the fiducial points corresponding to the marker can provide a set of fixed coordinates or landmarks within the digital content with which the surface area can be mapped relative to the fiducial points. In an embodiment, the marker can be comprised of a set of unique shapes, wherein predetermined combinations of the unique shapes can correspond to a target surface area (or available area, or areas) for displaying the displayed data. The predetermined combinations of the unique shapes can also correspond to predetermined digital content for displaying in the surface area. The predetermined combinations of the unique shapes can also correspond to/indicate a position/location where the digital content should be displayed at the surface area relative to a portion of the surface area. A combination of the set of points and unique identifiers can be used as well.

For example, the unique identifiers can be unique shapes that correlate to predetermined digital content as well as indicating where the digital content should be overlayed on the display (the screen position) relative to a set of points marked on the reference patch. The unique identifiers can also indicate a size of the digital content to be overlayed on the display, which can be adjustable based on the size of the surface area (also adjustable) and/or the size of the display of the first device 101. The unique identifiers can be relatively invisible or undetectable to the user, but readable by the first device 101 and cover predetermined areas of the reference patch. The unique identifiers, and by extension, the marker, can have an appearance that is marginally different from an appearance of the area of the reference patch. For example, the area of the reference patch can appear white to the user and the unique identifiers can also appear white to the user but may actually have a slightly darker pixel color that can be detected and interpreted by a device, such as the first device 101. For instance, the appearance of the unique identifiers can be 0.75% darker than the white color of the area of the reference patch. Such a small difference can be identified and discerned by the first device 101 while being substantially imperceptible to the user.

In an embodiment, the area of the reference patch can be divided into predetermined shapes, for instance a set of squares, and within each square, the marker (such as a "letter") can be included. For example, there can be 16 squares. Furthermore, subsets of the set of squares can be designated to represent varying information, such as a timestamp corresponding to 8 of the squares, a domain corresponding to 5 of the squares, a version corresponding to 1 of the squares, and additional information corresponding to a remainder of the squares. An identification based on the set of squares can be, for example, an 18-character (or "letter") hexadecimal. The set of squares can further include additional subsets for a randomization factor, which can be used for calculating a sha256 hash prior to encoding the reference patch with the hash. Together, the set of squares having the marker included therein can comprise the unique identifiers.

Moreover, the generating device 120 can also employ chroma subsampling to mark attributes represented by a particular pattern. In an embodiment, the generating device 120 can mark parts of the reference patch with predetermined patterns of pixel luma and chroma manipulation that represent a shape, a size, or a position of the surface area for displaying the digital content. Moreover, the generating device 120 can mark a perimeter of the reference patch with a predetermined edging pattern of pixel luma and chroma manipulation that represents a perimeter of the surface area for displaying the digital content.

The generating device 120 can further link the surface area with unique identifiers in step 205c. The unique identifiers can be hashed values (such as those described above) that are generated by the generating device 120 when the reference patch is generated (such as the one having the area of the reference patch divided into the subset of squares).

Figure 2C:
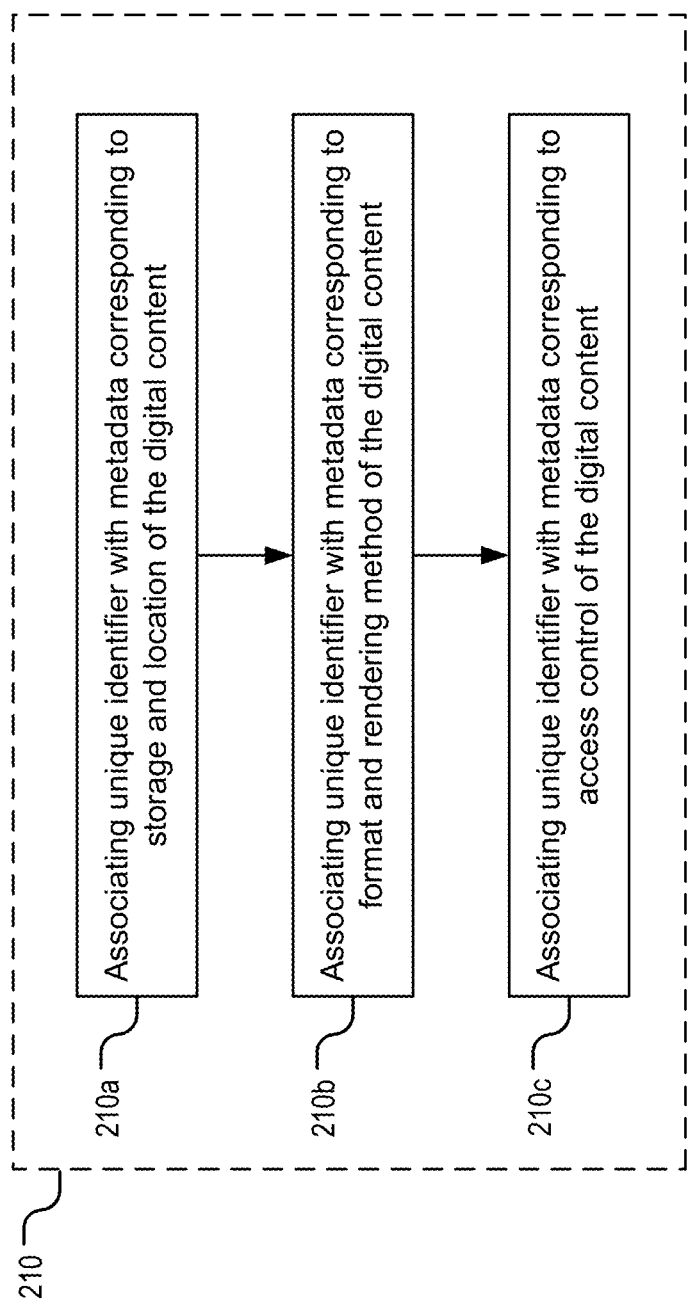
FIG. 2C is a flow chart of a sub-method of associating the surface area with digital content, according to an exemplary embodiment of the present disclosure.

FIG. 2C is a flow chart of a sub-method of associating the surface area with digital content, according to an embodiment of the present disclosure. In FIG. 2C, the generating device 120 uses additional processes to associate the surface area with digital content. In an embodiment, the generating device 120 can associate the unique identifiers corresponding to the surface area with metadata. In step 210a, the unique identifiers can be associated with metadata embodying information about the storage and location of the digital content. Moreover, in step 210b, the generating device 120 can associate the unique identifier of the surface area with metadata which embodies information about the format and rendering information used for the digital content. In step 210c, the generating device 120 can associate the unique identifiers of the surface area with metadata which embodies access control information of the digital content.

In an embodiment, the storage of the digital content can be on a remote server, such as the second device 150, and the location of the digital content can be the location address of the memory upon which it is stored at the remote server. The storage and location of the digital content are thus linked with the metadata that can point to where the digital content can later be obtained from. The digital content is not embedded into the displayed data. In an embodiment, the format and rendering information about the digital content is embodied in the metadata and associated with the unique identifiers. This information is helpful when the first device 101 or the third device 102 are on the receiving end of the transmitted displayed data and need to properly retrieve and process the digital content.

Moreover, in an embodiment, the access control of the digital content can also be encompassed in the metadata and associated with the unique identifiers corresponding to the surface area. The access control can be information defining whether the digital content can be accessed by certain individuals or within a certain geographical location. The access control information can define restrictions such as those placed upon time and date as to when and how long the digital content can be accessed. The access control information can define the type of display reserved for access by the first device 101. For example, a user may wish to restrict access to the digital content to certain types of devices, such as smartphone or tablets. Thus, the metadata defining a display requirement would encompass such an access control parameter.

Figure 2D:
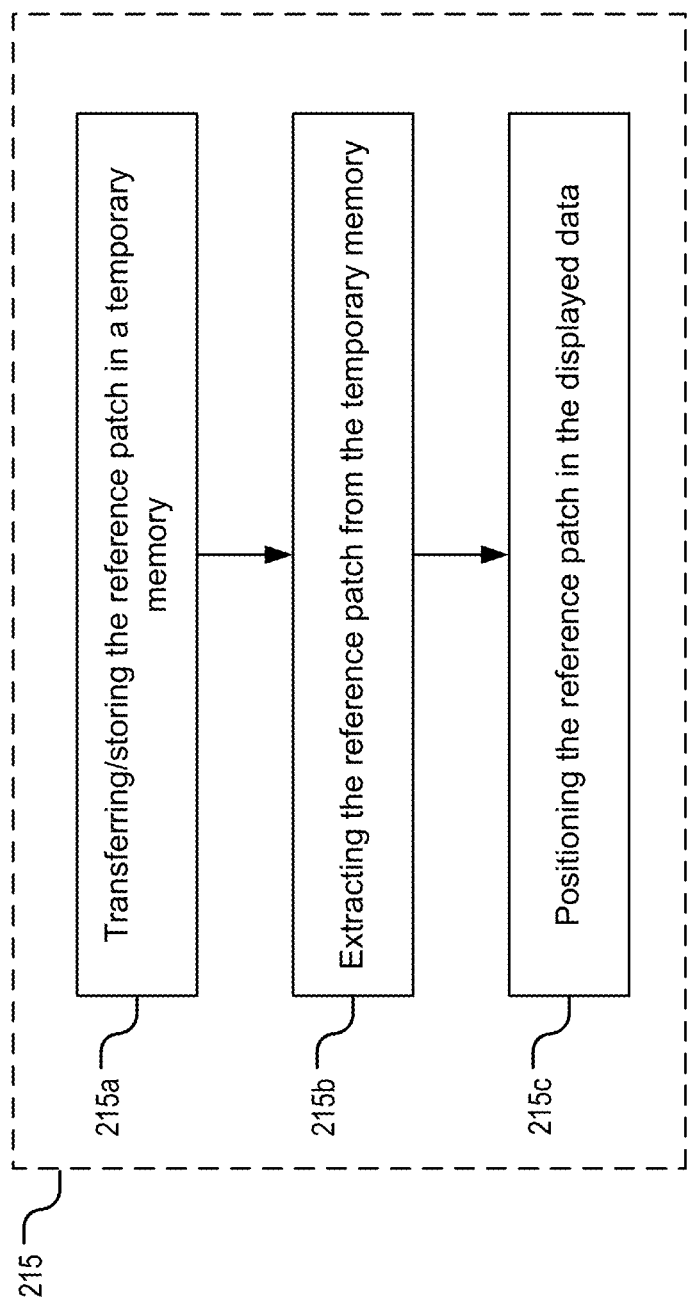
FIG. 2D is a flow chart of a sub-method of integrating the reference patch into the displayed data, according to an exemplary embodiment of the present disclosure.

FIG. 2D is a flow chart of a sub-method of integrating the reference patch into the displayed data, according to an embodiment of the present disclosure. In FIG. 2D, the generating device 120 uses additional processes to effectuate integration of the reference patch into the displayed data. In an embodiment, the first device 101 can temporarily transfer or store the reference patch in a storage of the first device 101 in step 215a. The storage can be accessed by the first device 101 for embedding the reference patch into the displayed data at any time. The first device 101 can extract the reference patch from the storage for embedding purposes in step 215b. The first device 101 can also arrange the reference patch at a predetermined location and with a predetermined reference patch size in step 215c. The first device 101 can further embed the reference patch such that a document, for example, having the reference patch embedded therein can be sent to a recipient, for example the second user using the third device 102, where he/she can access the document using the application on the third device 102 as further described below. Again, the features of the generating device 120 can be performed by the first device 101.

The displayed data can be output from a streaming application or a communication application with a data stream having the reference patch embedded therein. The actual digital content may not be sent along with the underlying displayed data or data stream, but only the unique identifier and/or a facade of the digital content is sent. The unique identifier and/or the underlying metadata can be stored in a cloud-based database such as MySQL which can point to the second device 150 or a cloud-based file hosting platform that ultimately houses the digital content. No limitation is to be taken with the order of the operation discussed herein; such that the sub-methods performed by the first device 101 can be carried out synchronous to one another, asynchronous, dependently or independently of one another, or in any combination. These stages can also be carried out in serial or in parallel fashion.

FIG. 3A is a flow chart for a method 300 of identifying the reference patch included in the displayed data and overlaying the digital content into displayed data, according to an embodiment of the present disclosure. In an embodiment, in step 305, the first device 101 can inspect the stream of data being outputted by the first device's 101 video or graphics card and onto the display of the first device 101. That is, the first device 101 can access a frame buffer of the GPU and analyze, frame by frame, in the frame buffer, the outputted stream of data which can include the displayed data. In an embodiment, a frame represents a section of the stream of the displayed data that is being displayed by the first device 101. In that regard, the first device 101 can inspect the outputted stream of data. The first device 101 can achieve this by intercepting and capturing data produced from the first device 101's video card or GPU that is communicated to the first device 101's display.

In an embodiment, in step 310, the first device 101 can process attributes of each pixel included in a single frame and detect groups of pixels within that frame, which may have a known predetermined pattern of pixel luma and chroma manipulation, in order to find the reference patch.

The inspected frame by frame stream of data is also used by the first device 101 to identify the reference patch which includes the unique identifiers therein. In an embodiment, the first device 101 employs pattern recognition algorithms to detect and identify the reference patch, the perimeter of the reference patch, and/or the area of the reference patch. In an embodiment, the first device 101 detects and identifies the reference patch via the marker itself. A variety of pattern recognition algorithms can be used, such as Artificial Neural Networks (ANN), Generative Adversarial Networks (GAN), thresholding, SVM (Support Vector Machines) or any classification and pattern recognition algorithm available conducive to computer vision. Computer vision techniques may be artificial intelligence techniques that train computers to interpret and understand a visual world. In an example, the computer vision techniques may be an image recognition task, a semantic segmentation task, and the like. In a non-limiting example, the processor-based computer vision operation can include sequences of filtering operations, with each sequential filtering stage acting upon the output of the previous filtering stage. For instance, when the processor (processing circuitry) is/includes a GPU, these filtering operations are carried out by fragment programs.

In another example, the computer vision techniques may be a processor-based computer vision technique. In an embodiment, the first device 101 can look for predetermined or repeatable patterns within the frame which indicates the presence of the reference patch. In an embodiment, the first device 101 can identify the reference patch based on a confidence level, the confidence level being high when the predetermined pattern of pixel luma and chroma manipulation and the predetermined edging pattern of pixel luma and chroma manipulation are detected in the reference patch. The confidence level can be lower when one or neither of the predetermined patterns is/are detected.

According to an embodiment, in the event that an input to the operation is an image, the input images can be initialized as textures and then mapped onto quadrilaterals. By displaying these quadrilaterals in appropriately sized windows, a one-to-one correspondence of image pixels to output fragments can be ensured. Similarly, when the input to the operation is an encoded image, a decoding process may be integrated into the processing steps described above. A complete computer vision algorithm can be created by implementing sequences of these filtering operations. After the texture has been filtered by the fragment program, the resulting image is placed into texture memory, either by using render-to-texture extensions or by copying the frame buffer into texture memory. In this way, the output image becomes the input texture to the next fragment program. This creates a pipeline that facilitates the entire computer vision algorithm. However, often a complete vision algorithm may require operations beyond filtering. For example, summations are common operations. Furthermore, more-generalized calculations, such as feature tracking, can also be mapped effectively onto graphics hardware.

In an embodiment, the reference patch can be identified by use of edge detection methods. In particular, edge detection can be used for the perimeter of the reference patch having a predetermined pattern (the predetermined edging pattern). In an example, the edge detection method may be a Canny edge detector. The Canny edge detector may run on the GPU. In one instance, the Canny edge detector can be implemented as a series of fragment programs, each performing a step of the algorithm.

In an embodiment, the identified reference patch can be tracked from frame to frame using feature vectors. Calculating feature vectors at detected feature points is an operation in computer vision. A feature in an image is a local area around a point with some higher-than-average amount of uniqueness. This makes the point easier to recognize in subsequent frames of video. The uniqueness of the point is characterized by computing a feature vector for each feature point. Feature vectors can be used to recognize the same point in different images and can be extended to more generalized object recognition techniques.

Feature detection can be achieved using methods similar to the Canny edge detector that instead search for corners rather than lines. If the feature points are being detected using sequences of filtering, the GPU can perform the filtering and read back to the CPU a buffer that flags which pixels are feature points. The CPU can then quickly scan the buffer to locate each of the feature points, creating a list of image locations at which feature vectors on the GPU will be calculated.

In step 315, the first device 101 can decode the encoded data of the unique identifiers from the area of the reference patch, wherein the unique identifiers correspond to the surface area. The unique identifiers can be hashed values that could have been generated beforehand by the first device 101.

In step 320, the first device 101 can use the unique identifiers to link the surface area with the digital content using metadata and retrieve the digital content based on the unique identifiers.

In step 325, the first device 101 can overlay the digital content onto the surface area of the displayed data based on the unique identifiers.

Again, the method of identifying the reference patch included in the displayed data and augmenting the displayed data is described as performed by the first device 101, however, the second device 150 can instead perform the same functions.

Figure 3B:
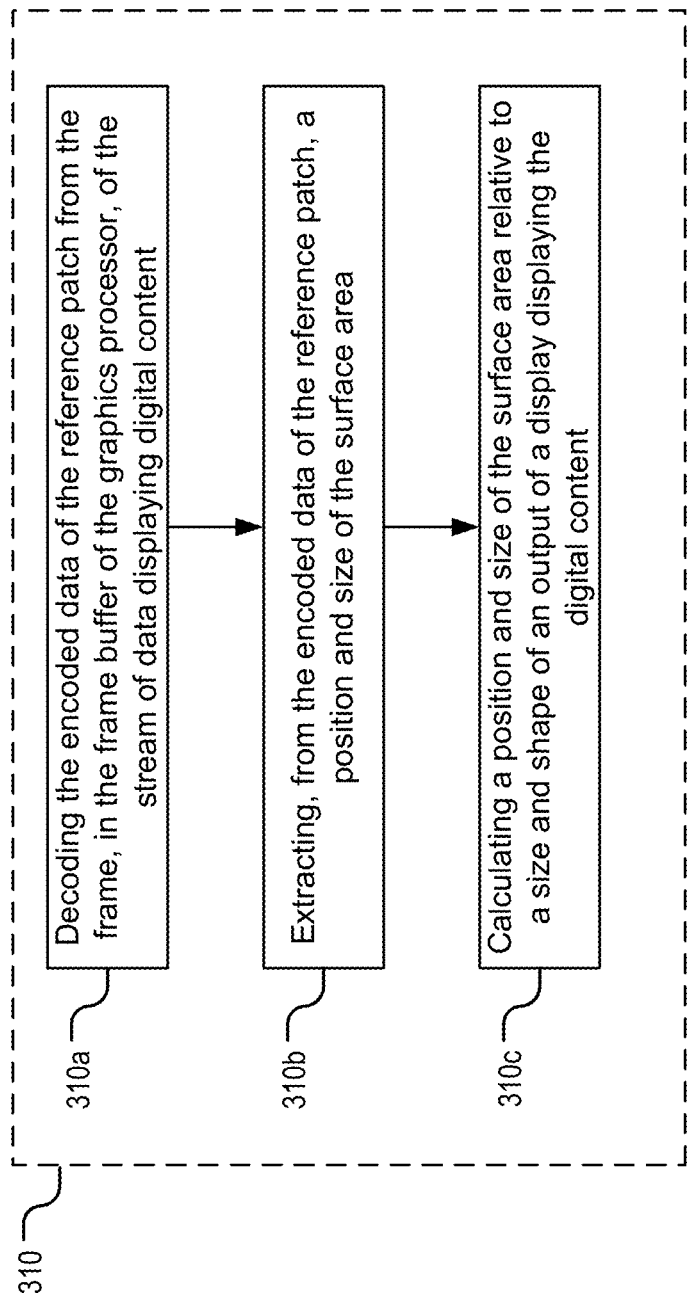
FIG. 3B is a flow chart of a sub-method of identifying the reference patch with unique identifiers corresponding to the surface area from the stream of data, according to an exemplary embodiment of the present disclosure.

In an embodiment, the first device 101 identifies the surface area corresponding to the reference patch by employing further processes to process the frames. To this end, FIG. 3B is a flow chart of a sub-method of identifying the reference patch with the unique identifiers corresponding to the surface area from the stream of data, according to an embodiment of the present disclosure.

In step 310a, the first device 101 can decode the encoded reference patch from the frame. The encoded reference patch can include the marker that makes up the unique identifiers within the reference patch incorporated previously. The reference patch can also include other identifying information. The marker can be disposed within the reference patch, such as within the area of the reference patch or along a perimeter of the reference patch, or alternatively, outside of the area of the reference patch.

Whatever schema is used to encode the marker in the reference patch is also used in reverse operation to decode the underlying information contained within the reference patch. As stated above, in an embodiment, the encoded marker can be patterns generated and decoded using the ARUCO algorithm or by other algorithms that encode data according to a predetermined approach.

In step 310b, the first device 101 can also extract attributes of the surface area from the reference patch. In an embodiment, the position, size, shape, and perimeter of the surface area are extracted, although other parameters can be extracted as well. Other parameters include boundary lines, area, angle, depth of field, distance, ratio of pairs of points, or the like. In an embodiment, where shape and perimeter are designated as the attributes, the first device 101 makes determinations of size, shape, and perimeter and outputs that result. Specifically, the size or shape of the surface area can be determined by evaluating a predetermined or repeatable pattern of pixel luma and chroma manipulation in the reference patch. The predetermined pattern can be marked on, within the area, or outside of the area of the reference patch. The predetermined pattern can correspond to the size or shape of the surface area. The predetermined pattern can correspond to the size or shape of the digital content. The perimeter of the surface area can also be determined by evaluating a predetermined edging pattern of pixel luma and chroma manipulation. The predetermined edging pattern can be marked on, within the area, or outside of the area of the reference patch. That is, the predetermined edging pattern of the reference patch can correspond to the perimeter of the surface area. The predetermined edging pattern of the reference patch can correspond to the perimeter of the digital content.

In step 310c, the first device 101 can also calculate a position and size of the surface area relative to the size and shape (dimensions) of the output signal from the display that is displaying the displayed data. In an embodiment, the calculating of the size, relative to the size and shape of the outputted signal from the display, includes determining the size of the surface area by inspecting a furthest measured distance between the edges of the surface area. Furthermore, the calculating of a location of the surface area, relative to the size and shape of the outputted signal from the display, includes determining the location of the surface area relative to the size and shape of the displayed data outputted through the display. This includes calculating the distance between the outer edges of the surface area and the inner edges of the displayed data being outputted by the display. The determined size and location of the surface area can be outputted as a result. Notably, prior to overlaying the digital content into the displayed data, the first device 101 can adjust, based on the predetermined pattern and the predetermined edging pattern, the size and perimeter of the digital content for displaying in the display of the first device 101. For example, the size and perimeter of the digital content for displaying in the display of the first device 101 can be scaled based on the size and perimeter of the surface area and/or the size of the display.

The first device 101 can provide information regarding the characteristics of the output video signal, such that the digital content that is later overlaid can correctly be displayed to account for various manipulations or transformations that may take place due to hardware constraints, user interaction, image degradation, or application intervention. Such manipulations and transformations may be the relocation, resizing, and scaling of the reference patch and/or the surface area, although the manipulations and transformations are not limited to those enumerated herein.

In an embodiment, the reference patch itself can be used as the reference for which the digital content is displayed on the surface area. In one example, the location at which to display the digital content in the surface area can be determined relative to the location of the reference patch on the displayed data. In one example, the size of the surface area can be determined relative to the size of the reference patch on the displayed data. In an example employing a combination of the two properties of the reference patch, the reference patch displayed in the displayed data on a smart phone having a predetermined size and a surface area can be scaled relative to the predetermined size of the display of the smart phone. This can be further adjusted when the reference patch in the same displayed data is displayed on a desktop monitor, such that the predetermined size of the reference patch in the displayed data displayed on the desktop monitor is larger and thus the size of the surface area can be scaled to be larger as well. Furthermore, the location of the surface area can be determined via a function of the predetermined size of the reference patch. For example, the location at which to display the digital content in the surface area can be disposed some multiple widths laterally away from the location of the reference patch as well as some multiple heights longitudinally away from the location of the reference patch. As such, the predetermined size of the reference patch can be a function of the size of the display of the first device 101. For example, the predetermined size of the reference patch can be a percentage of the width and height of the display, and thus the location and the size of the surface area are also a function of the width and height of the display of the first device 101.

In an embodiment, the first device 101 can determine an alternative location at which to display the digital content based on behaviors of the user. For example, the first device 101 can compare the encoded data corresponding to the location at which to display the digital content in the surface area to training data describing movement and focus of the user's eyes while viewing the displayed data. Upon determining the location at which to display the digital content in the surface area (as encoded in the reference patch) is not the same as the training data, the first device 101 can instead display the digital content at the location described by the training data as being where the user's eyes are focused in the displayed data at a particular time. For example, the user's eyes may be predisposed to viewing a bottom-right of a slide in a slide deck. The first device 101 can decode the reference patch and determine the digital content is to be displayed in a bottom-left of the slide deck. The training data can indicate that, for example, the user's eyes only focus on the bottom-left of the slide 10% of the time, while user's eyes focus on the bottom-right of the slide 75% of the time. Thus, the first device 101 can then display the digital content in the bottom-right of the slide instead of the bottom-left. The training data can also be based on more than one user, such as a test population viewing a draft of the slide deck. For example, the training data can be based on multiple presentations of the slide deck given to multiple audiences, wherein eye tracking software determines the average location of the audience's focus on each of the slides.

Figure 3C:
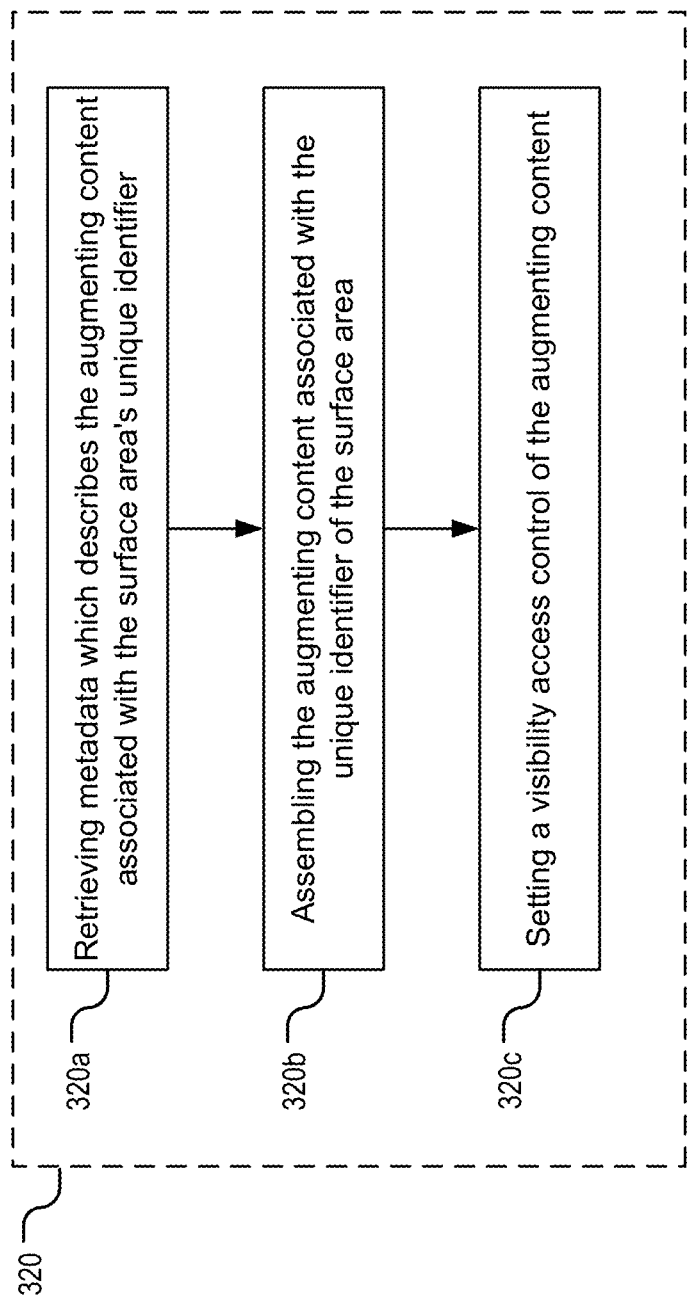
FIG. 3C is a flow chart of a sub-method of associating the unique identifiers with digital content, according to an exemplary embodiment of the present disclosure.

In an embodiment, the first device 101 employs other processes to associate the unique identifiers with the digital content. To this end, FIG. 3C is a flow chart of a sub-method of associating the unique identifiers with digital content, according to an embodiment of the present disclosure. In step 320a, the first device 101 can send the unique identifiers to the second device 150 and the second device 150 can retrieve metadata that describes the digital content, the digital content being associated with the surface area through the unique identifiers. This can be done by querying a remote location, such as a database or a repository, using the unique identifiers of the surface area as the query key. In an embodiment, the first device 101 sends the unique identifiers to the second device 150 and the second device 150 associates the unique identifier of the reference patch to corresponding digital content based on the metadata. The metadata associated with the surface area's unique identifier can be transmitted to the first device 101 with the augmentation content.

In step 320b, the first device 101 can assemble the digital content that is associated with the surface area's unique identifier. The assembly can entail loading the necessary assets for assembling the digital content. In an embodiment, this can entail loading manipulation software or drivers in order to enable the first device 101 to process the digital content. Other assembling processes can be the loading of rendering information in order to transform and manipulate an individual portion of the digital content. Furthermore, the loaded manipulation software, drivers, or rendering information can be used to compile all the individual portions of the entire digital content together. In an embodiment, this can include adapting the file formats of the digital content, delaying the playback for the digital content, converting from one format to another, scaling the resolution up or down, converting the color space, etc.

In step 320c, the first device 101 can provide access control parameters for the digital content. The access control parameters can dictate whether the digital content is visible to some users, or to some geographical locations, or to some types of displays and not others, as well as the date and time or duration of time a user can access the digital content or is allowed to access. In an embodiment, visibility of the digital content can be defined for an individual. For example, the digital content can be a video that is appropriate for users over a certain age. In an embodiment, visibility of the digital content can be defined for a geographic location. For example, the digital content can be a video that is region-locked based on a location of the first device 101. In an embodiment, visibility of the digital content can be defined for a type of display displaying the displayed data. For example, the digital content can be VR-based and will only display with a VR headset. In an embodiment, visibility of the digital content can be defined for a predetermined date and a predetermined time. For example, the digital content can be a video that will only be made publicly available after a predetermined date and a predetermined time. In an embodiment, visibility of the digital content can be defined for a time period. For example, the digital content can be a video that is only available for viewing during a holiday. The first device 101 thus calculates the user's access level based on those parameters and provides an output result as to the user's ability to access the digital content, i.e., whether the digital content will be visible or invisible to the user. Note that the access control parameters can be global, for all the displayed data, or it can be localized per surface area and the underlying digital content.

Referring again to FIG. 3A, in step 325, the first device 101 can carry on the processes of overlaying the surface area with the digital content into the displayed data in accordance with the surface area, the position, and the size identified by the unique identifier. The first device 101 can determine or adjust the size and location of the assembled digital content on the surface area relative to the size and shape of the displayed data being outputted by the display. Then, the first device 101 can render the associated digital content (or the assembled individual portions) over the surface area's shape and perimeter using the size and location information. Thus, the digital content is superimposed on top of the surface area.

Figure 4A:
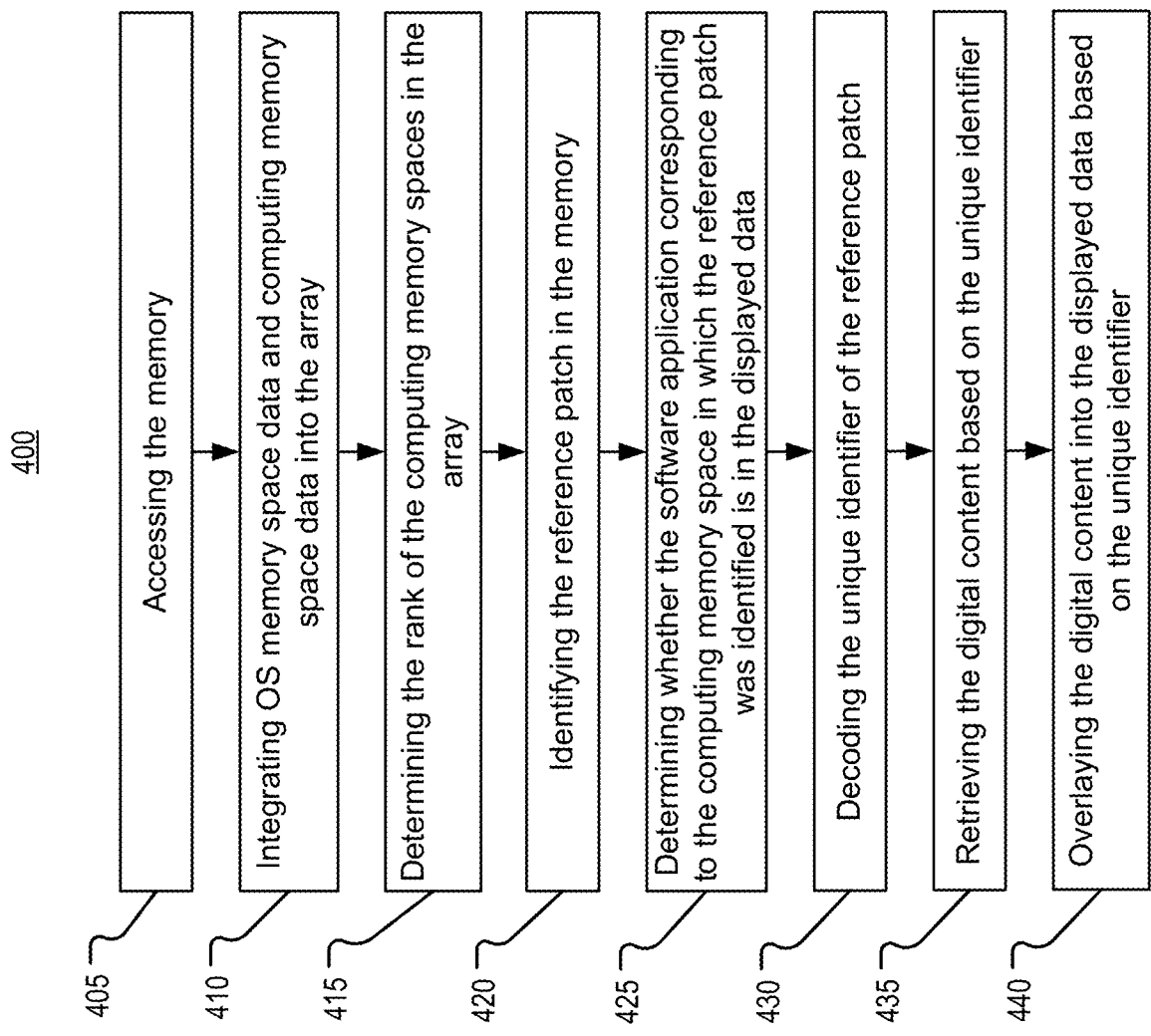
FIG. 4A is a flow chart for a method of identifying the reference patch included in the displayed data and overlaying the digital content into displayed data, according to an exemplary embodiment of the present disclosure.

FIG. 4A is a flow chart for a method 400 of identifying the reference patch included in the displayed data and overlaying the digital content into displayed data, according to an embodiment of the present disclosure. In an embodiment, in step 405, the first device 101 can inspect the main memory on the first device 101. Again, the main memory of the first device 101 refers to physical internal memory of the first device 101 where all the software applications are loaded for execution. Sometimes complete software applications can be loaded into the main memory, while other times a certain portion or routine of the software application can be loaded into the main memory only when it is called by the software application. The first device 101 can access the main memory of the first device 101 including an operating system (OS) memory space, a computing memory space, and an application sub-memory space for the computing memory space in order to determine, for example, which software applications are running (computing memory space), how many windows are open for each software application (application sub-memory space), and which windows are visible and where they are located (or their movement) on the display of the first device 101 (OS memory space). That is to say, the OS memory takes up a space in (or portion of) the main memory, the computing memory takes up a space in (or portion of) the main memory, and the application sub-memory takes up a space in (or portion of) the computer memory. This information can be stored, for example, in the respective memory spaces. Other information related to each software application can be obtained and stored and is not limited to the aforementioned features.

In an embodiment, in step 410, the first device 101 can aggregate the various memory spaces into an array (or table or handle). That is, the first device 101 can integrate data corresponding to the OS memory space and data corresponding to the computing memory space into the array. The array can be stored on the main memory of the first device 101 and include information regarding the software applications running on the first device 101. In an embodiment, the computing memory spaces (including the application sub-memory spaces) can be aggregated into the array. This can be achieved by querying the main memory for a list of computing memory spaces of all corresponding software applications governed by the OS and aggregating all the computing memory spaces obtained from the query into the array. This can be, for example, aggregating the computing memory space of a PowerPoint file and the computing memory space of a Word file into the array. The information in the computing memory spaces stored in the array can include metadata of the corresponding software application. For example, for PowerPoint, the information in the array can include a number of slides in a presentation, notes for each slide, etc. Moreover, each window within the PowerPoint file and/or the Word file can be allocated to a sub-memory space. For example, the array can include the location of each window for each software application running on the first device 101, which can be expressed as an x- and y-value pixel coordinate of a center of the window. For example, the array can include the size of each window for each software application running on the first device 101, which can be expressed as a height and a width value.

In an embodiment, in step 415, the first device 101 can determine a rank or a hierarchy of the computing memory spaces in the array. The rank can describe whether a window of a software application or the software application itself is active or more active as compared to another software application running on the first device 101. An active window or software application can correspond to the window or software application that is currently selected or clicked in or maximized. For example, an active window can be a window of a web browser that the user is scrolling through. In an embodiment, this can be achieved by querying the OS memory space and each computing memory space in the main memory for existing sub-memory spaces, querying the OS memory space and each computing memory space in the main memory for a rank or hierarchical relationship between (software application) sub-memory spaces found, recording the list of sub-memory spaces and the rank relationship between sub-memory spaces, and associating the list of sub-memory spaces and the rank relationship between the sub-memory spaces with the array. For example, a window of a first application can be an active window on the first device 101 and has a higher rank than an inactive window of a second application also running on the first device 101. The active window can be the window the user has currently selected and displayed over all other windows on the display of the first device 101. Notably, there can be multiple visible windows, but one of said multiple visible windows can have a higher rank because it is currently selected by the user and is the active window.

For example, two documents can be viewed in a split-screen side-by-side arrangement without any overlap of one window over another window, and a third document can be covered by the two documents in the split-screen side-by-side arrangement. In such an example, the user can have one of the two split-screen documents selected, wherein the selected document is the active window and would have a higher rank (the highest rank) than the other of the two split-screen documents since the higher (highest) ranked document is selected by the user. The third document behind the two split-screen documents would have a lower rank (the lowest rank) than both of the two split-screen documents since it is not visible to the user. Upon bringing the third document to the front of the display and on top of the two split-screen documents, the third document rank would then become the highest rank, while the two split screen documents' rank would become lower (the lowest) than the third document (and the rank of the two split screen documents can be equal).

In an embodiment, the rank can be determined based on eye or gaze tracking of the user (consistent with or independent of whether a window is selected or has an active cursor). For example, a first window and a second window can be visible on the display, wherein the first window can include a video streaming from a streaming service and the second window can be a word processing document. The rank of the first window and the second window can be based on, for example, a gaze time that tracks how long the user's eyes have looked at one of the two windows over a predetermined time frame. The user may have the word processing document selected and active while the user scrolls through the document, but the user may actually be watching the video instead. In such a scenario, an accrued gaze time of the first window having the video can be, for example, 13 seconds out of a 15 second predetermined time frame, with the other 2 seconds in the predetermined time frame being attributed to looking at the first window having the word processing document. Thus, the rank of the first window having the video can be higher than the rank of the second window because the gaze time of the first window is higher than the gaze time of the second window. Notably, if there is only one open window, the rank of that window would be ranked as the top-ranked window (because it is the only window) regardless of/independent from other user input, such as gaze, selection, etc.

In an embodiment, the rank can be determined based on the eye tracking and a selection by the user. For example, the user can select the first window having the video and looking at a description of the video playing in the same first window. In such a scenario, both the eye tracking accruing a longer gaze time (than the second window) and the user selecting the first window to make it the active window can make the first window the top-ranked window.

Thus, the rank can be determined based on one or a plurality of elements. The more elements being used, the more accurate the determination of the rank. Hence, the rank can be determined by a combination of eye or gaze tracking, an input selection by a user (for example, the user clicking on an icon or a display element in a window (the first window or the second window), a user hovering a mouse or pointer over a portion of a window (without necessarily clicking or selecting anything), etc. The rank determination can also go beyond these elements/factors to include preset settings related to a particular user and/or past behavior/experiences. For example, the user can preset certain settings and/or the user's device can learn from user's past behavior/experiences about his/her preference when two or more windows are displayed at the same time side by side.

For example, this particular user may always play a video in the first window while working on a presentation in the second window. In such case, the user's device can learn from this behavior and use this knowledge to more accurately determine the rank (for example, when the first window has a video playing and the second window corresponds to a work processing document or a presentation, the active window is likely the second window). Such knowledge can be paired with eye gaze direction and other factors such as mouse/cursor movement, etc. in order to more accurately determine the rank.

In an embodiment, in step 420, the inspected main memory data can also include a reference patch therein and the first device 101 can identify the reference patch in the main memory data. In an embodiment, the first device 101 can detect and identify the reference patch in the main memory by a value, such as a known encoding, where the format of the of the data itself can indicate to the application where the reference patch is located. For example, the known encoding can be 25 bytes long and in a predetermined position within the binary bits of the main memory. In an embodiment, the reference patch can be identified by parsing an application (e.g. a Word document), looking through the corresponding metadata in the computing memory space, and finding the reference patch in the metadata by attempting to match the metadata with a predetermined indicator indicating the presence of the reference patch, such as the unique identifier.

In step 425, the first device 101 can determine whether the software application corresponding to the computing memory space (and sub-memory space) in which the reference patch was identified is active or in the displayed data. Referring to the example of step 415, while the window of the first application can include the reference patch, the inactive window of the second application can become active and overlay over the window of the first application which was previously the active window. In such a scenario, the reference patch in the window of the first application can become covered by the window of the second application. As such, the secondary digital content of the reference patch in the window of the first application need not be displayed or can cease being displayed. However, in an alternative scenario, the window of the first application, including the reference patch, can be active and the reference patch therein can be uncovered and visible.

In step 430, upon determining the software application corresponding to the computing memory space (and sub-memory space) in which the reference patch was identified is active or in the displayed data, the first device 101 can decode the encoded data of the unique identifiers from the area of the reference patch, wherein the unique identifiers correspond to the surface area.

In step 435, the first device 101 can use the unique identifiers to link the surface area with the digital content using metadata and retrieve the digital content based on the unique identifiers.

In step 440, the first device 101 can overlay the digital content onto the surface area of the displayed data based on the unique identifiers.

Again, the method of identifying the reference patch included in the displayed data and augmenting the displayed data is described as performed by the first device 101, however, the second device 150 can instead perform the same functions.

Figure 4B:
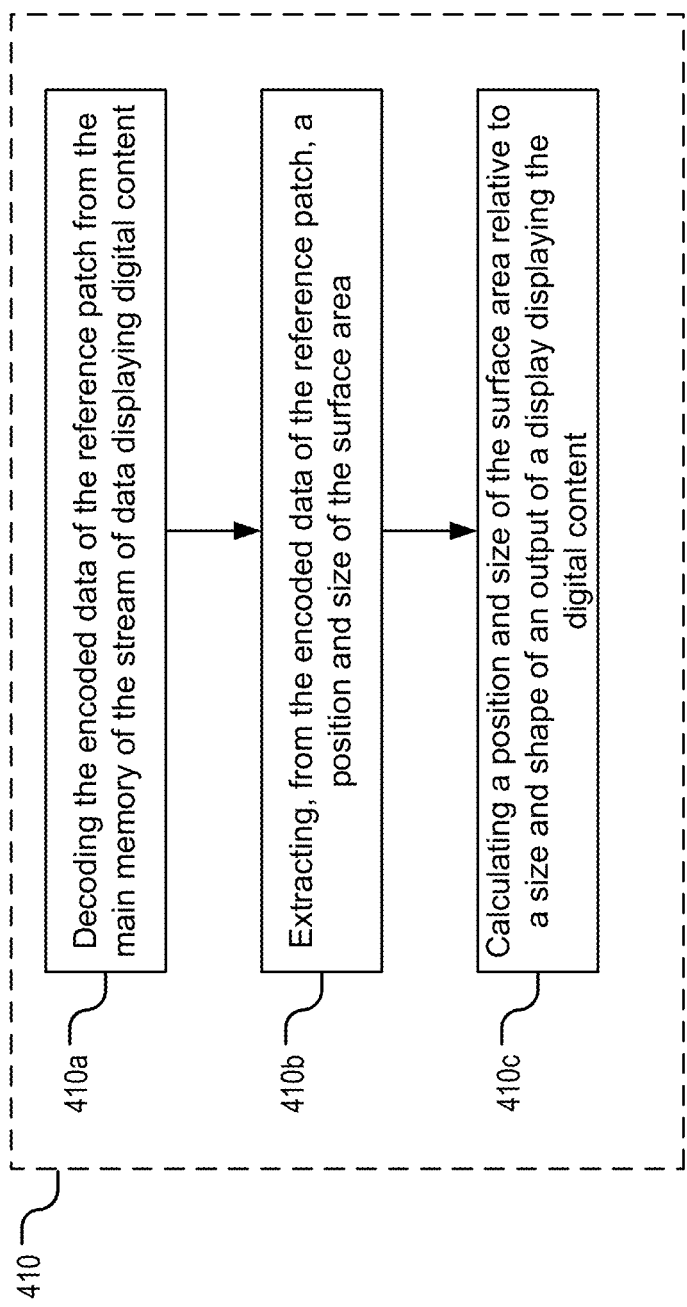
FIG. 4B is a flow chart of a sub-method of identifying the reference patch with the unique identifiers corresponding to the surface area from the stream of data, according to an exemplary embodiment of the present disclosure.

In an embodiment, the first device 101 identifies the surface area corresponding to the reference patch by employing further processes. To this end, FIG. 4B is a flow chart of a sub-method of identifying the reference patch with the unique identifiers corresponding to the surface area from the stream of data, according to an embodiment of the present disclosure.

In step 410*a*, the first device 101 can decode the encoded reference patch from the main memory. The encoded reference patch can include the marker that makes up the unique identifiers within the reference patch incorporated previously. The reference patch can also include other identifying information. The marker can be disposed within the reference patch, such as within the area of the reference patch or along a perimeter of the reference patch, or alternatively, outside of the area of the reference patch.

Again, whatever schema is used to encode the marker in the reference patch is also used in reverse operation to decode the underlying information contained within the reference patch. As stated above, in an embodiment, the encoded marker can be patterns generated and decoded using the ARUCO algorithm or by other algorithms that encode data according to a predetermined approach.

Similarly, as described above, in step 410*b*, the first device 101 can also extract attributes of the surface area from the reference patch.

Similarly, as described above, in step 410*c*, the first device 101 can also calculate a position and size of the surface area relative to the size and shape (dimensions) of the output signal from the display that is displaying the displayed data.

Similarly, as described above, the first device 101 can provide information regarding the characteristics of the output video signal, such that the digital content that is later overlaid can correctly be displayed to account for various manipulations or transformations that may take place due to hardware constraints, user interaction, image degradation, or application intervention.

Similarly, as described above, the reference patch itself can be used as the reference for which the digital content is displayed on the surface area.

Similarly, as described above, the first device 101 can determine an alternative location at which to display the digital content based on behaviors of the user.

Figure 4C:
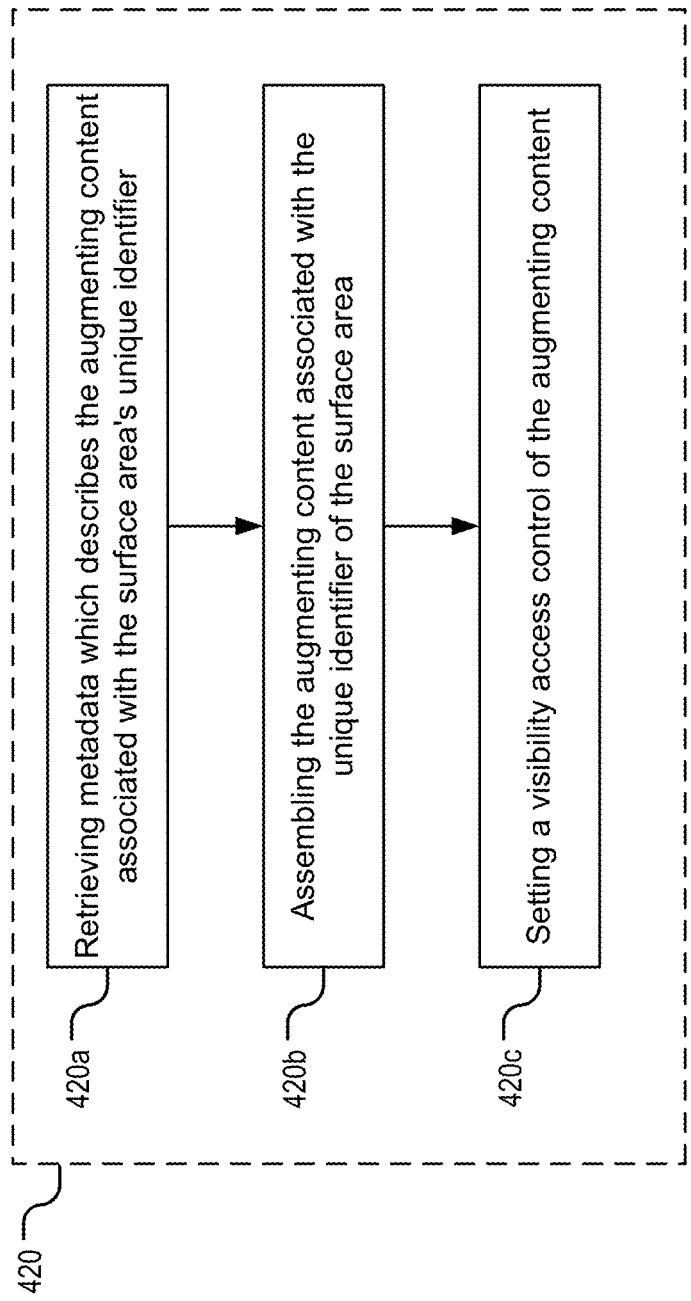
FIG. 4C is a flow chart of a sub-method of associating the unique identifiers with digital content, according to an exemplary embodiment of the present disclosure.

In an embodiment, the first device 101 employs other processes to associate the unique identifiers with the digital content. To this end, FIG. 4C is a flow chart of a sub-method of associating the unique identifiers with digital content, according to an embodiment of the present disclosure. In step 420a, the first device 101 can send the unique identifiers to the second device 150 and the second device 150 can retrieve metadata that describes the digital content, the digital content being associated with the surface area through the unique identifiers. This can be done by querying a remote location, such as a database or a repository, using the unique identifiers of the surface area as the query key. In an embodiment, the first device 101 sends the unique identifiers to the second device 150 and the second device 150 associates the unique identifier of the reference patch to corresponding digital content based on the metadata. The metadata associated with the surface area's unique identifier can be transmitted to the first device 101 with the augmentation content.

In step 420b, the first device 101 can assemble the digital content that is associated with the surface area's unique identifier. The assembly can entail loading the necessary assets for assembling the digital content. In an embodiment, this can entail loading manipulation software or drivers in order to enable the first device 101 to process the digital content. Other assembling processes can be the loading of rendering information in order to transform and manipulate an individual portion of the digital content. Furthermore, the loaded manipulation software, drivers, or rendering information can be used to compile all the individual portions of the entire digital content together. In an embodiment, this can include adapting the file formats of the digital content, delaying the playback for the digital content, converting from one format to another, scaling the resolution up or down, converting the color space, etc.

In step 420c, the first device 101 can provide access control parameters for the digital content. The access control parameters can dictate whether the digital content is visible to some users, or to some geographical locations, or to some types of displays and not others, as well as the date and time or duration of time a user can access the digital content or is allowed to access. In an embodiment, visibility of the digital content can be defined for an individual. For example, the digital content can be a video that is appropriate for users over a certain age. In an embodiment, visibility of the digital content can be defined for a geographic location. For example, the digital content can be a video that is region-locked based on a location of the first device 101. In an embodiment, visibility of the digital content can be defined for a type of display displaying the displayed data. For example, the digital content can be VR-based and will only display with a VR headset. In an embodiment, visibility of the digital content can be defined for a predetermined date and a predetermined time. For example, the digital content can be a video that will only be made publicly available after a predetermined date and a predetermined time. In an embodiment, visibility of the digital content can be defined for a time period. For example, the digital content can be a video that is only available for viewing during a holiday. The first device 101 thus calculates the user's access level based on those parameters and provides an output result as to the user's ability to access the digital content, i.e., whether the digital content will be visible or invisible to the user. Note that the access control parameters can be global, for all the displayed data, or it can be localized per surface area and the underlying digital content.

Referring again to FIG. 4A, in step 440, the first device 101 can carry on the processes of overlaying the surface area with the digital content into the displayed data in accordance with the surface area, the position, and the size identified by the unique identifier. The first device 101 can determine or adjust the size and location of the assembled digital content on the surface area relative to the size and shape of the displayed data being outputted by the display. Then, the first device 101 can render the associated digital content (or the assembled individual portions) over the surface area's shape and perimeter using the size and location information. Thus, the digital content is superimposed on top of the surface area.

The first device 101 can continuously monitor changes that are taking place at the end user's device (such as the second device 150 of the second user) to determine whether the reference patch and/or the surface area has moved or been transformed in any way (see below for additional description). Thus, the first device 101 can continuously inspect subsequent frames of the stream of the data (for example, every 1 ms or by reviewing every new frame), displaying the displayed data, to determine these changes. The first device 101 can further continuously decode the reference patch's data from the identified reference patch. Then the first device 101 can continuously extract attributes from the data, the attributes being of size, shape, and perimeter and comparing those changes between the current frame and last frame. Further, the first device 101 can continuously calculate the size and location of the surface area and compare changes between the size and location of the surface area from the current and the last frame and then continuously overlay the digital content on the surface area by incorporating the changes in the reference patch's attributes and the changes in the size and location of the surface area. As stated above, when the user manipulates his/her display device by scaling, rotating, resizing or even shifting the views from one display device and onto another display device, the first device 101 can track these changes and ensure that the digital content is properly being superimposed onto the surface area.

In an embodiment, the methodologies discussed with reference to FIG. 3 that use the frame buffer can be used without using the methodologies discussed with reference to FIG. 4 that use the memory space and vice-versa. In other words, in an embodiment, either the methodologies of FIG. 3 or the methodologies of FIG. 4 can be used to identifying a reference patch and overlay the digital content in displayed data.

However, in an embodiment, both the methodologies discussed with reference to FIG. 3 that use the frame buffer and the methodologies discussed with reference to FIG. 4 that use the memory space can be used together. In such embodiment, a device can use both approaches to accurately identify the same reference patch (applying both approaches can yield better results). In an embodiment, both approaches can be used to identify different reference patches. For example, if a document includes a plurality of reference patches, the first device can apply the methodologies discussed with reference to FIG. 3 to a first reference patch, while applying the methodologies discussed with reference to FIG. 4 to a second reference patch.

In one embodiment, the reference patch may be or comprise the token described below.

Figure 5:
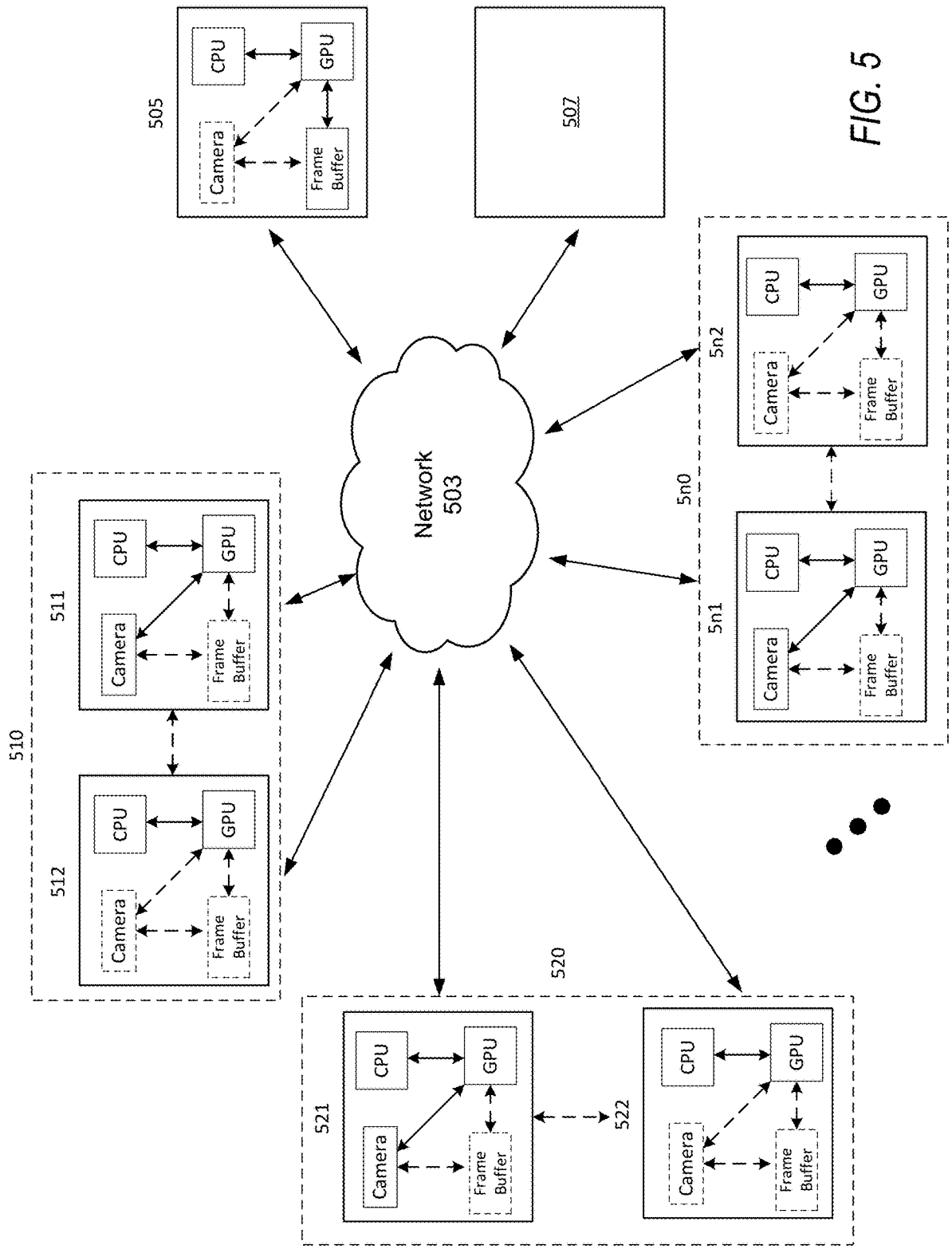
FIG. 5 is a schematic view of user devices communicatively connected to a server, according to an exemplary embodiment of the present disclosure.

FIG. 5 is a schematic view of an electronic device, such as a first client/user primary device (an authenticatee primary device 511) which comprises, among other things, a CPU, a GPU, a camera, and optionally a frame buffer. Note the devices illustrated in FIG. 5 can correspond to the devices illustrated in FIG. 1. The authenticatee primary device 511 is communicatively connected, via a network 503, to an authenticator device 505, according to an embodiment of the present disclosure. The authenticatee primary device 511 can be connected, via the network 503 to an intermediary electronic device, such as a server (an intermediary device 507), according to an embodiment of the present disclosure. A second client/user device (an authenticatee secondary device 512), comprising, among other things, a CPU, a GPU, optionally a camera, and optionally a frame buffer can be communicatively connected to any combination of the authenticatee primary device 511 (via the network 503 and/or another connection), the authenticator device 505 via the network 503, and the intermediary device 507. Together, the authenticatee primary device 511 and the authenticatee secondary device 512 can be referred to as an "authenticatee device pair". In an embodiment, the authenticatee primary device 511 can have one frame buffer. The one frame buffer can be used by both the camera and the GPU. In an embodiment, the authenticatee primary device 511 can have more than one frame buffer. In such an embodiment, one frame buffer can be used for the GPU and a different frame buffer can be used for the camera. A frame buffer used for a camera can be referred to as a "camera frame buffer" or other equivalent term.

Further, in an embodiment, another client/user device pair 520, comprising a second authenticatee primary device 521 and a second authenticatee secondary device 522 can be communicatively connected to any combination of the authenticator device 505, the intermediary device 507, and another authenticate device pair 510 via the network 503. In such an embodiment, the authenticatee device pair 510 can be referred to as a "first authenticatee device pair 510", comprising a "first authenticatee primary device 511" and a "first authenticatee secondary device 512" to distinguish from the second authenticatee device pair 520. As shown, a plurality of such client/user devices can be so communicatively connected, for example, an Nth client/user device pair 5n0 comprising a primary device 5n1 and a secondary device 5n2. The generation of the token can be performed by a generator. The generator can be a separate component of the authenticator device 505 and/or the intermediary device 507 or can be implemented in the processing circuitry (e.g. CPU or GPU) of the authenticator device 505 and/or the intermediary device 507. The detector can be a separate component of the authenticator device 505 and/or the intermediary device 507 or can be implemented in the processing circuitry (e.g. CPU or GPU) of the authenticator device 505 and/or the intermediary device 507. An embodiment in which the generator and detector are each part of the intermediary device can be referred to as a "server-based" or a "client-server" embodiment. An embodiment in which the generator and detector are each part of the authenticator device 505 can be referred to as a "peer-to-peer" embodiment.

In an embodiment, the multifactor authentication can be used as part of a high-stakes interaction involving real-time video and audio data. For example, this high-stakes interaction can be a teleconference opening a credit card at a bank. In this teleconference, a bank client attempting to open the credit card would be the authenticatee and a bank employee would be the authenticator. The bank client can use a suitable electronic device which has a camera such as a laptop, desktop computer with a webcam as an authenticatee primary device 511. The client can also have an authenticatee secondary device 512 which has both display capability (e.g. screen) and a camera, for example a smartphone or tablet. The bank employee can use a suitable electronic device such as a laptop, desktop computer, a smartphone, or a tablet as an authenticator device 505 equipped with a CPU, GPU, and a frame buffer. In a teleconference, the authenticator device 505 can be equipped with a camera.

In an embodiment, a secure piece of information can be generated and transmitted to the authenticatee secondary device 512. The generation can be performed by the generator. The generator can be part of authenticator device 505, the intermediary device 507, or a combination of these. This secure piece of information can take the form of visual information able to be displayed on the authenticatee secondary device 512. The secure piece of information can be referred to as a "token". The secure piece of information can be unique (e.g. a unique identifier). The uniqueness can be on a client-level (e.g. each client has a unique piece of information) or on an interaction-level (i.e. each interaction authentication has a unique piece of information). The piece of information can then be transmitted to the authenticatee secondary device 512.

The client can then position the authenticatee secondary device 512 such that the token displayed by the authenticatee secondary device 512 is visible to the camera of the authenticatee primary device 511. The client can also be visible at the same time such that there is a portion of video captured by the authenticatee primary device 511 which shows both the authenticatee secondary device 512 displaying the token and the client (for example, the face of the person) simultaneously. In an exemplary embodiment, the client holds a smartphone displaying the token up such that the client's face and the screen of the smartphone are visible on camera simultaneously. The visual data captured this way can be transmitted by the authenticatee primary device 511 to the detector. The detector can be implemented by the CPU or other circuitry of authenticator device 505, the intermediary device 507, or a combination of these. The detector can detect the token in the visual data. Such detection may be performed as described above for the reference patch. If the token is detected, an authentication can be transmitted to the authenticator device 505. The authentication can authenticate a video connection between the authenticatee primary device and the authenticator device. For example, the video connection can be a teleconference as described above. In an embodiment, if the token is not detected, the authenticator device can terminate the video connection.

In an embodiment, authentication of the connection between the authenticatee primary device and the authenticator device can be valid for a single instance or session. For example, the authentication can be valid for a single teleconference or meeting. A subsequent connection can then require a subsequent authentication. In an embodiment, the authentication can be valid for more than one session using the same authenticatee primary device. For example, the authenticatee primary device can, once a connection involving said device is authenticated, not require additional authentications for subsequent connections. Such subsequent connections can be made to the same authenticator device or can be made to other authenticator devices. This may be known as "device authentication", "device-based authentication", or another similar term. Such device authentication can be achieved by any suitable means. For example, a user may have a record such as a profile, account, or the like, which is associated with one or more user devices. Such devices can be authenticated as described above, and the authentication recorded or stored such that subsequent uses of the device or connections involving the device do not need to be authenticated. In an embodiment, the authentication can be valid for more than one session involving the same user. For example, a user can, once a connection involving said user is authenticated, not require additional authentications for subsequent connections. Such subsequent connections can be made using the same authenticator device or can be made to other authenticator devices. Such subsequent connections can be made using the same authenticatee devices or can be made using other authenticatee devices. This may be known as "user authentication", "user-based authentication", or another similar term. For example, a user may have a record such as a profile, account, or the like. Such users can be authenticated as described above, and the authentication recorded or stored such that subsequent connections involving the user do not need to be authenticated.

In an embodiment, the video connection is established between the authenticatee primary device (first device) and the authenticator device. The video connection can be established by the by the apparatus or authenticator device. Such establishment can be performed before transmitting the token. In an embodiment, the video connection can be established between the authenticatee primary device and the authenticator device which are not already connected. That is, no previous connection exists between the authenticatee primary device and the authenticator device at the time of the establishment of the video connection. In an embodiment, the video connection can be established between such devices between which a non-video connection exists. For example, the video connection can be established in addition to an audio connection (e.g. "turn on video").

In an embodiment, a connection can be established by another device that is not the apparatus or authenticator device prior to the establishment of the video connection which involves the apparatus or authenticator device. For example, the authentication provided can be performed as service between a user and another party (e.g. a bank employee), with the authentication being performed by a third party (i.e. one which is not the user or the bank employee). In such an embodiment, the third party may be called upon or otherwise employed by either the user or the other party or both to provide authentication. In such an embodiment, the authentication can authenticate a connection between the authenticator device and a user device, a connection between the authenticator device and a device of another party, or both. In an embodiment, the connection between the user device and the device of another party can be a video connection. In an embodiment, the connection between the user device and the device of another party can be another type of connection which does not involve video. In an embodiment, a third party acting as an authenticator can disconnect following the authentication. In an embodiment, a third party acting as an authenticator can terminate a connection between the user and the other party if the token is not detected.

In an illustrative example, a bank employee can establish a video connection to a client as apart of bank operation or providing service to the client. This video can be established between the bank employees computer and the client's computer, which is equipped with a webcam. In order to authenticate the client and ensure the identity of the client and/or prevent fraud, the bank employee can transmit to the client's phone the token. The client can then hold the phone, displaying the token, up such that it is visible to the webcam of the client's computer. The client's face can also be visible simultaneously (as described below) and/or certain background features can be visible simultaneously (as described below). The token can be detected, then the connection can be authenticated by an authentication generated by the bank employee's computer.

Figure 6A:
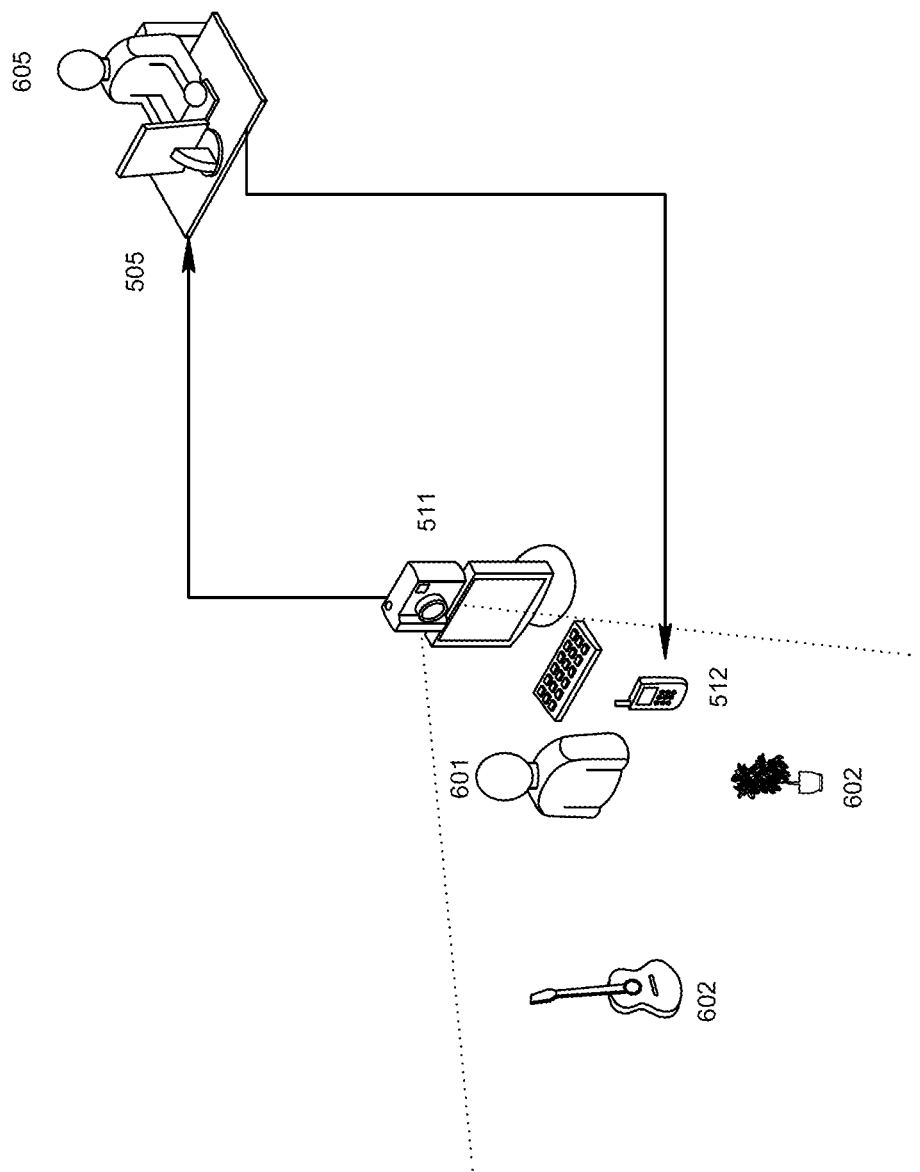
FIG. 6A is a depiction of an exemplary embodiment of an interaction which involves the multifactor authentication.
Figure 6B:
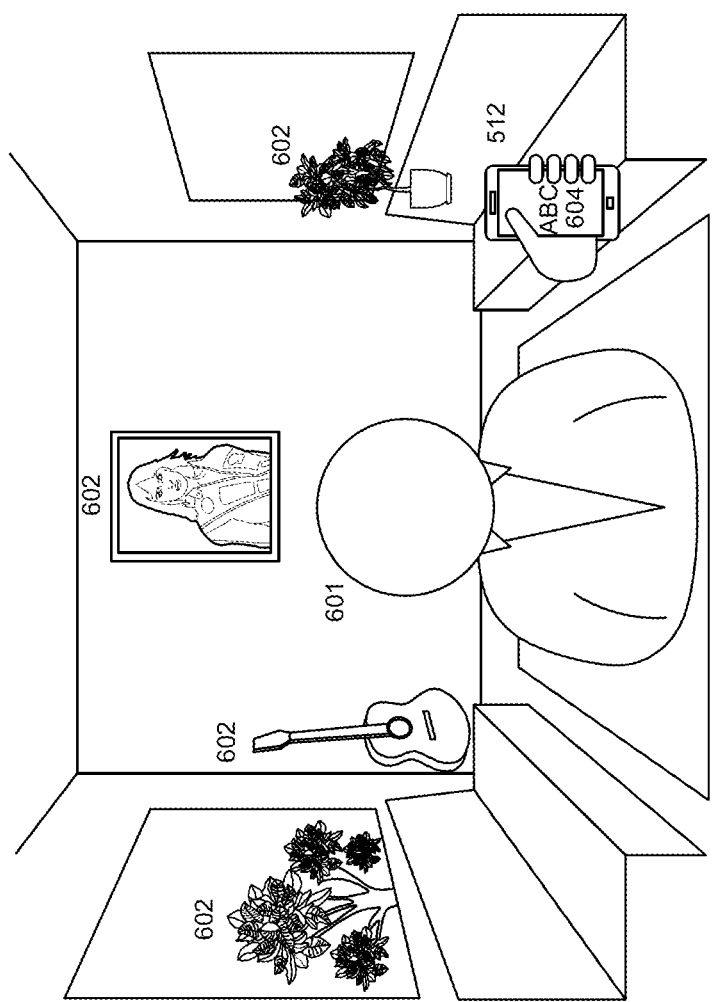
FIG. 6B is a depiction of exemplary visual data captured by the authenticatee primary device, according to an exemplary embodiment of the present disclosure.

FIG. 6A depicts an exemplary embodiment of an authentication of the present disclosure. The client/user 601 is shown using the authenticatee device pair 510 comprising the authenticatee primary device 511 depicted as a desktop computer equipped with a webcam and the authenticatee secondary device 512 depicted as a smartphone. The webcam captures visual data within a field of view (depicted as the cone formed from the dotted lines emanating from the webcam). Visible within the field of view is the client/user 601 (and the user's face), the authenticatee secondary device 512 displaying the token received from an authenticator 605 (e.g. the bank employee) using the authenticator device 505 depicted as a desktop computer, and various background features or objects 602. These background features or objects can be physical objects surrounding the primary device 511 or the secondary device 512 which are captured by the camera. In other words, the physical objects may be objects in the background of the devices or user 601 (for example, items 602). The visual data is transmitted from the authenticatee primary device 511 to the authenticator device 505 as part of the authentication. A depiction of exemplary visual data captured by the authenticatee primary device 511 during an authentication is shown in FIG. 6B. Clearly visible in the visual data is the client/user 601, the authenticatee secondary device 512 displaying the token 604 (for example, via a reference patch as discussed above), and various background features or objects 602 (shown as a guitar, a houseplant, a painting displayed on a wall, and a tree visible through a window).

In an embodiment, the token can comprise or be made of patterns, shapes, pixel arrangements, or the like. The token can display the piece of information directly (e.g. as text or numerals) or can encode the piece of information in patterns, shapes, pixel arrangement, pixel luma, and pixel chroma, among others as described above. For example, the token can take the form of a barcode or matrix barcode. Such patterns and the like can be detectable by a human observer or undetectable by a human observer. Such undetectable patterns and the like can be detectable by image analysis, the analysis being performed by an electronic device itself or with the aid of an electronic device. The encoding of the information can be decoded by a human observer or can be decoded by an electronic device. The token can be static (e.g. an image or other patterns, shapes, pixel arrangements, or the like which do not change with time). The token can be dynamic (e.g. a video or time evolving pattern, shape, pixel arrangement, or the like). In an embodiment, a single token may be used. In an embodiment, multiple different tokens can be used. For example, when video is captured by the primary device 511, the secondary device 512 can display multiple different tokens in succession such that the display of the tokes is imperceptible by the human eye—for example, 20 different tokens can be displayed within one second. Therefore, the authentication can be based not only on the detection of the 20 different tokens but also on the order in which the 20 different tokens are displayed.

In an embodiment, the token can require a password, code, PIN, or other authenticatee knowledge in order to be displayed. Such authenticatee knowledge can be previously established or separately established in other communications between the authenticatee and the authenticator. The input of such authenticatee knowledge to display the token can be referred to as "unlocking" the token. For example, when the client establishes an account with the bank (e.g. an online account), a password or PIN could be provided to the client by SMS or email or other suitable communication method. The client can set the password or PIN during online account creation. This password or PIN can be the same as an online account password used to login to the bank's website or to access the teleconference. The password or PIN used to unlock the token can be different from the online account password. Such a use of a password, code, PIN, or other client knowledge can add an additional knowledge factor to the authentication. The addition of this knowledge factor can be advantageous for increasing the confidence of the authentication.

In an embodiment, the token can be displayed by the authenticatee secondary device 512 in a manner that renders the token able to be detected by the authenticator device 505 but not detectable by a human viewing the display of the authenticatee secondary device 512, the display of the authenticator device 505, or some other device displaying the data. For example, the token can be displayed intermittently. The token can be displayed for only a short period of time before it is no longer displayed. The period of time the token is displayed can be referred to as the "token interval". Such intermittent display of the token can be accomplished by adding the token to individual display frames. Typically, display devices are capable of displaying 60 to 144 frames per second, determined by the refresh rate of the display, and a webcam captures 30 to 120 frames per second.

By adding the token to one or a small number of frames (e.g. 5, 10, 15, 20, 25, 30, etc.), the display of the token by the authenticatee secondary device can be captured by the webcam present in the authenticatee primary device and transmitted in the video feed to the authenticator device 505. The authenticator device 505 can then detect the presence of the token by analyzing the frames of the video. Such analysis may be performed by accessing the frame buffer of the authenticator device as described above. Limiting the number of consecutive frames in which the token is visible can result in a token interval which is too short to be captured by a human observer (e.g. a fraction of second). Following the token interval, the token can be re-displayed after a period of time (referred to as the "non-token interval"), this short period of time being equal or unequal in length to the token interval. The frequency of the token intervals can be referred to as the "token display frequency". The token(s) displayed during the token intervals may be the same token or may be different tokens. In an embodiment in which the tokens are different tokens, the authentication may use a sequence of tokens.

In an embodiment, the authenticatee primary device may display a reciprocity token. The reciprocity token may be a token as described above. The reciprocity token may be generated by the authenticatee primary device, the authenticatee secondary device, or some other device which is not the authenticator device. The reciprocity token may be useful for reciprocal or peer-to-peer authentication. Such reciprocal authentication may increase the security of an interaction by confirming to the authenticatee the identity of the authenticator. The reciprocity token may be configured to be captured by the authenticatee primary device and be transmitted to the detector. The detection of the reciprocity token may cause the authenticator device to transmit to the authenticatee primary device and/or the authenticatee secondary device some information which may act as an authentication factor for the authentication of the authenticator to the authenticatee. For example, the reciprocity token may be visual data displayed on the authenticatee secondary device which when detected by the detector causes the authenticator device and/or the intermediary device to transmit a reciprocity token response to the authenticatee primary device and/or the authenticatee secondary device. This reciprocity token response may be unique to the reciprocity token and/or the identity of the authenticator device and/or the intermediary device. The reciprocity token response may be identifiable to the authenticatee or may be invisible or undetectable by the authenticatee but detectable by one or more devices.

For example, the user may display his/her smartphone which displays both a token to confirm the user's identity to the bank the user is contacting and a reciprocity token to confirm that the user is contacting the bank and not an imposter or fraudulent user or entity. In this example, the reciprocity token may comprise information which is encoded to be only decodable by the bank or which instructs a device operated by the bank having specific properties or responses to provide the correct response. A reciprocity token response may itself be a token. Such a response may be provided in visual data transmitted by the authenticator to the authenticatee (e.g. in a screen share or video chat). In an embodiment, the reciprocity token comprises a sequence of such tokens.

In an embodiment in which a sequence of tokens is used, the sequence may be determined by an interaction between the authenticator and authenticatee mediated by tokens and reciprocity tokens. For example, the token may comprise an instruction as to the identity or some specific attribute of the next reciprocity token and vice-versa.

The use of a reciprocity token may be particularly advantageous for asymmetric interactions. Asymmetric interactions may involve interaction between entities which are of fundamentally different types, such as an individual interacting with a bank to perform a financial transaction, an individual interacting with a government or law enforcement entity, or two or more parties interacting through a mediating entity. Asymmetric interactions may preclude the use of certain types of communication (e.g. an employee may not be in a situation where he or she can use video) or certain aspects of communication (e.g. an employee may need to have their background blurred or substituted due to sensitive location, sensitive information in the background, or policy).

The visual data captured by the authenticatee primary device 511 can then be transmitted by the authenticatee primary device 511 to the detector. The detector can be part of the authenticator device 505, the intermediary device 507, or a combination of these. The transmitted visual data comprising the token can be analyzed and the token can be read and/or decoded by either the authenticator device 505 or the intermediary device 507. If read and/or decoded by the intermediary device 507, the decoded piece of information obtained from the token can then be transmitted to the authenticator device 505. The detector can detect the token as described above.

In an embodiment, the detection of the token comprises a validity check. The validity check can involve determination that the detected token matches the generated token transmitted to the authenticatee secondary device 512.

In an embodiment, the validity check can involve a time check. In an embodiment, the token or the piece of information can be valid for only a set period of time. This period of time can be referred to as the "token lifespan". The token can have the token lifespan built-in. For example, the token can be generated or configured such that following the token lifespan, it cannot be displayed or is deleted. The detector can be configured so as to reject the piece of information (i.e. not transmit an authentication) after a set period of time. For example, the generator can generate the piece of information, encode the piece of information in the token, transmit the token to the authenticatee secondary device 512. If the detector does not detect the token in received visual data via a transmission from the authenticatee primary device 511 or the authenticator device 105 does not receive an authentication transmitted by the detector in a set amount of time (e.g. 10 seconds, 30 seconds, 60 seconds, 5 minutes, etc), the detector or the authenticator device 105 can reject the authentication, not generate the authentication, and/or terminate the video connection. A token which is past its token lifespan can be referred to as a "stale token". The time check can be the process of determining if the token is or is not stale.

In an embodiment, the reciprocity token may be detected as described above. The detecting may be the same as the detecting for the token. In an embodiment, the detection of the reciprocity token may be performed by the intermediary device, the authenticatee primary device, and/or the authenticatee secondary device. In such an embodiment, the authenticatee primary device, and/or the authenticatee secondary device may comprise a detector as described above.

In an embodiment, the client/user's face is captured by the camera of the authenticatee primary device 511. The user's face and the token being displayed should be visible simultaneously. The visual data comprising the client/user's face can then be analyzed using facial recognition. This facial recognition can be used to create or determine a biometric factor to be used in the authentication. Such a biometric factor may be advantageous for increasing the confidence of the authentication. In general, the facial recognition can be performed by any suitable method or with any suitable technique or combination of techniques. The facial recognition can be performed by the authenticator device or can be performed by another device. The facial recognition can compare the detected user's face to a reference face for that user. Such a reference face can be taken from or accessed from any suitable source. For example, the reference face can be generated during an initial user interaction or connection. The user can scan, photograph, video, or otherwise capture visual data comprising their face, transmit such visual data to another device (such as the authenticator device) and that reference can be stored and/or analyzed the results of such analysis stored. Such visual data can be the user's face itself or an image of the user's face. Such an image can be, for example, part of an identification such as a driver's license or passport. The reference or results can be associated with a user profile, account, or the like. This profile can be accessed during the analysis to allow the comparison. The reference face can be detected from or taken from another source, such as a database or social media account. For example, the DMV or other governmental database which contains an image of an individual's face can be accessed to provide the reference face. Since both the token and the client/user's face are present in the same visual data, the value of the possession factor created by the token can be increased by linking the possession and biometric factors. It can be verified that the client/user both HAS the appropriate authenticatee secondary device and IS the person displaying the recognized face.

In an embodiment, background features or objects 602 are captured by the camera of the authenticatee primary device 511. These background features or objects 602 can be detected by the methods described above. These background features or objects 602 can be used to create or determine a location factor to be used in the authentication. The process of detection of the background features and objects 602 and the generation of the location feature can be referred to as "background analysis". Such a location factor may be advantageous for increasing the confidence of the authentication. The creation or determination of the location factor can involve visual data captured by the authenticatee secondary device 512. This visual data can contain the same background features or objects 602 as the visual data captured by the authenticatee primary device 511.

In an embodiment, the background analysis can distinguish a computer-generated background which is used to replace the real-world background in transmitted visual data. Some webcam or teleconferencing software has the ability to replace the background with other imagery. Since such a situation would make the generation of the location factor impossible or make the location factor worthless in the authentication, the detection of such replaced backgrounds can be advantageous. In an embodiment, the background features or objects 602 or attributes thereof (e.g. shadows, movement, etc.) can be compared with expected features or objects or attributes thereof. For example, if a window is detected in the background, a determination of night or day can be made. If the interaction is taking place at a time where the authenticatee is expected to experiencing night, but daylight or the sun is visible in the window, the background can be determined to be fake. The authentication can be configured to only transmit an authentication if the background is determined to be real.

Analyzing the background/physical objects and/or the face of the user along with the token supplements the generation of the authentication. Thus, in an embodiment, the more "things" (besides the token) are analyzed, the more precise the authentication result.

In an embodiment, an additional feature of authentication can be generated and transmitted by the authenticatee secondary device 512. For example, a smartphone can require a passcode to be unlocked or to transmit an additional knowledge feature. In an embodiment, a smartphone can be equipped with facial recognition. This authenticatee secondary device 512 facial recognition can be separate and distinct from the facial recognition of the detector. This can provide an additional biometric feature.

In an embodiment, the authenticatee primary device and/or the authenticatee secondary device can collect a security factor data which is at least one of a user input, a device location, a biometric data, and a user behavioral profile. The security factor data can be used to create or determine an additional security factor as described above. Such an additional security factor can be a knowledge factor, a biometric factor, a location factor, or a behavioral factor as described above. In an embodiment, the user input can be or comprise a password, code, passphrase, PIN or other similar user knowledge. The device location can comprise GPS data, cellphone tower data, IP address, and the like as described above. The biometric data can be any suitable biometric data. Examples of such biometric data include, but are not limited to a retinal scan comprising a retinal pattern or from which a retinal pattern may be determined, an iris scan comprising an iris pattern or from which an iris pattern may be determined, a fingerprint scan comprising a fingerprint pattern or from which a fingerprint pattern may be determined, a voiceprint, a palm scan comprising a palm vein pattern or from which a palm vein pattern may be determined, facial data enabling facial recognition, and a DNA scan. The authenticatee primary device and/or the authenticatee secondary device can collect the biometric data. In an embodiment, another device or suitable peripheral attached to the authenticatee primary device and/or the authenticatee secondary device can collect the biometric data.

Processing and/or analysis of the biometric data to produce a suitable biometric factor can be performed by the authenticatee primary device, the authenticatee secondary device, the authenticator device, the detector, another device, or any combination thereof. The user behavioral profile can be or comprise data related to behaviors of the user. The behaviors can be as described above. The authenticatee primary device and/or the authenticatee secondary device can collect the behavioral data. In an embodiment, another device or suitable peripheral attached to the authenticatee primary device and/or the authenticatee secondary device can collect the behavioral data. Processing and/or analysis of the behavioral data to produce the user behavioral profile can be performed by the authenticatee primary device, the authenticatee secondary device, the authenticator device, the detector, another device, or any combination thereof. The authenticatee primary device and/or the authenticatee secondary device can transmit the security factor data to the detector. Such transmission can take place as described above.

In an embodiment, the detection can comprise a calculation of confidence. The calculation of confidence can be performed using the individual factors determined by and/or transmitted to the detector. The calculation of confidence can apply a confidence weight or value to each of the factors. The confidence can be used to determine whether or not to transmit the authentication to the authenticator device. A minimum value of the confidence can be referred to as the "confidence threshold". This confidence threshold can be determined, chosen, or set manually (e.g. through bank employee action) or automatically.

Figure 7:
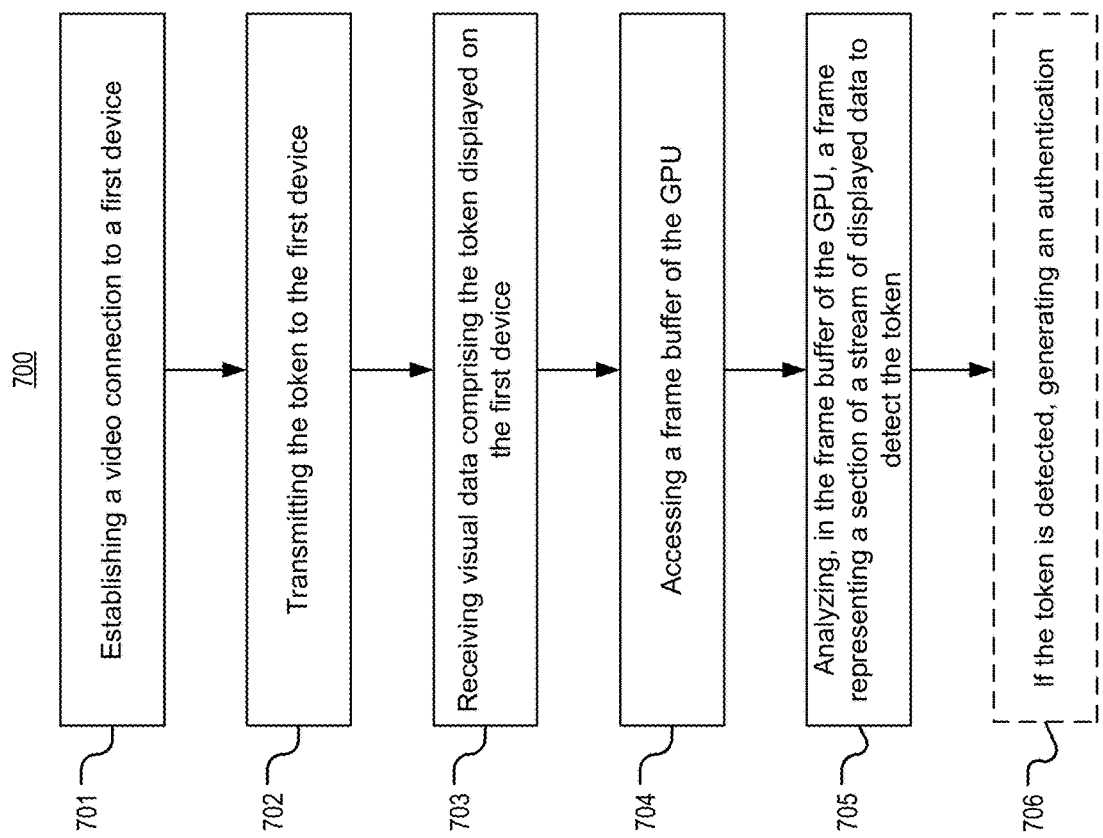
FIG. 7 is a flowchart for a method of multifactor authentication, according to an exemplary embodiment of the present disclosure

In order to achieve the functionality described above, the apparatus/electronic device of the current disclosure can perform the following process. FIG. 7 depicts a flowchart outlining the steps involved in transmitting and detecting the token according to an embodiment of present disclosure. The first step is optionally generating 701 a token. The second step is transmitting 702 the token to a first device (e.g. the authenticatee secondary device 512). The token may be displayed by the first device. The third step is receiving 703 visual data comprising the token displayed on the first device. The visual data can be captured by the second device (e.g. the authenticatee primary device 511). The fourth step is accessing 704 the frame buffer of the GPU. The fifth step is analyzing 705, in the frame buffer of the GPU, a frame representing a section of a stream of displayed data. The analyzing can detect the token. If the token is detected, the sixth step is transmitting 706 an authentication. The authentication can authenticate a connection between the authenticator device 505 and the authenticatee primary device 511. In an embodiment, the authenticator device 505 can establish this connection.

An application can be installed or accessible on the authenticatee primary device 511 for executing the methods described herein. The application can also be integrated into the operating system of the authenticatee primary device 511. The authenticatee primary device 511 can be any electronic device such as, but not limited to, a personal computer, a tablet pc, a smart-phone, a smart-watch, an integrated AR/VR (Augmented Reality/Virtual Reality) headwear with the necessary computing and computer vision components installed (e.g., a central processing unit (CPU), a graphics processing unit (GPU), integrated graphics on the CPU, etc.), a smart-television, an interactive screen, a smart projector or a projected platform, an IoT (Internet of things) device or the like.

As illustrated in FIG. 5, the authenticatee primary device 511 includes a CPU, a GPU, and optionally a frame buffer, among other components (discussed in more detail in FIGS. 8-10). In an embodiment, the authenticatee primary device 511 can call graphics that are displayed on a display. The graphics of the authenticatee primary device 511 can be processed by the GPU and optionally rendered in scenes stored on the frame buffer that is coupled to the display. The CPU can have an associated CPU memory and the GPU can have an associated video or GPU memory. The frame buffer can be an allocated area of the video memory. It can be understood that the CPU can have multiple cores or can itself be one of multiple processing cores in the authenticatee primary device 511. The CPU can execute commands in a CPU programming language such as C++. The GPU can execute commands in a GPU programming language such as HLSL. The GPU can also include multiple cores that are specialized for graphic processing tasks. Although the above description was discussed with respect to the authenticatee primary device 511, it is to be understood that the same description applies to the other devices (512, 521, 522, 5n1, and 5n2) of FIG. 5.

Embodiments of the subject matter and the functional operations described in this specification are implemented by processing circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of a data processing apparatus/device, (such as the server, the authenticatee primary device 511, or the like). The computer storage medium can be a machine-readable storage device, a machine-readable storage substrate, a random or serial access memory device, or a combination of one or more of them.

The term "data processing apparatus" refers to data processing hardware and can encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program can, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both, or any other kind of central processing unit. Generally, a CPU will receive instructions and data from a read-only memory or a random access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML, page, to a user device, e.g., for purposes of displaying data to and receiving user input from a user interacting with the user device, which acts as a client. Data generated at the user device, e.g., a result of the user interaction, can be received from the user device at the server.

Electronic device 800 shown in FIG. 8 can be an example of one or more of the devices shown in FIG. 1. In an embodiment, device 800 can be a smartphone. However, the skilled artisan will appreciate that the features described herein can be adapted to be implemented on other devices (e.g., a laptop, a tablet, a server, an e-reader, a camera, a navigation device, etc.). The device 800 of FIG. 8 includes processing circuitry, as discussed above. The processing circuitry includes one or more of the elements discussed next with reference to FIG. 8. The device 800 can include other components not explicitly illustrated in FIG. 8, such as a CPU, GPU, frame buffer, etc. The device 800 includes a controller 810 and a wireless communication processor 802 connected to an antenna 801. A speaker 804 and a microphone 805 are connected to a voice processor 803.

The controller 810 can include one or more processors/processing circuitry (CPU, GPU, or other circuitry) and can control each element in the device 800 to perform functions related to communication control, audio signal processing, graphics processing, control for the audio signal processing, still and moving image processing and control, and other kinds of signal processing. The controller 810 can perform these functions by executing instructions stored in a memory 850. Alternatively or in addition to the local storage of the memory 850, the functions can be executed using instructions stored on an external device accessed on a network or on a non-transitory computer readable medium.

The memory 850 includes but is not limited to Read Only Memory (ROM), Random Access Memory (RAM), or a memory array including a combination of volatile and non-volatile memory units. The memory 850 can be utilized as working memory by the controller 810 while executing the processes and algorithms of the present disclosure. Additionally, the memory 850 can be used for long-term storage, e.g., of image data and information related thereto.

The device 800 includes a control line CL and data line DL as internal communication bus lines. Control data to/from the controller 810 can be transmitted through the control line CL. The data line DL can be used for transmission of voice data, display data, etc.

The antenna 801 transmits/receives electromagnetic wave signals between base stations for performing radio-based communication, such as the various forms of cellular telephone communication. The wireless communication processor 802 controls the communication performed between the device 800 and other external devices via the antenna 801. For example, the wireless communication processor 802 can control communication between base stations for cellular phone communication.

The speaker 804 emits an audio signal corresponding to audio data supplied from the voice processor 803. The microphone 805 detects surrounding audio and converts the detected audio into an audio signal. The audio signal can then be output to the voice processor 803 for further processing. The voice processor 803 demodulates and/or decodes the audio data read from the memory 850 or audio data received by the wireless communication processor 802 and/or a short-distance wireless communication processor 807. Additionally, the voice processor 803 can decode audio signals obtained by the microphone 805.

The exemplary device 800 can also include a display 820, a touch panel 830, an operation key 840, and a short-distance communication processor 807 connected to an antenna 806. The display 820 can be an LCD, an organic electroluminescence display panel, or another display screen technology. In addition to displaying still and moving image data, the display 820 can display operational inputs, such as numbers or icons which can be used for control of the device 800. The display 820 can additionally display a GUI for a user to control aspects of the device 800 and/or other devices. Further, the display 820 can display characters and images received by the device 800 and/or stored in the memory 850 or accessed from an external device on a network. For example, the device 800 can access a network such as the Internet and display text and/or images transmitted from a Web server.

The touch panel 830 can include a physical touch panel display screen and a touch panel driver. The touch panel 830 can include one or more touch sensors for detecting an input operation on an operation surface of the touch panel display screen. The touch panel 830 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus can include a conductive material at least at the tip of the stylus such that the sensors included in the touch panel 830 can detect when the stylus approaches/contacts the operation surface of the touch panel display (similar to the case in which a finger is used for the touch operation).

In certain aspects of the present disclosure, the touch panel 830 can be disposed adjacent to the display 820 (e.g., laminated) or can be formed integrally with the display 820. For simplicity, the present disclosure assumes the touch panel 830 is formed integrally with the display 820 and therefore, examples discussed herein can describe touch operations being performed on the surface of the display 820 rather than the touch panel 830. However, the skilled artisan will appreciate that this is not limiting.

For simplicity, the present disclosure assumes the touch panel 830 is a capacitance-type touch panel technology. However, it should be appreciated that aspects of the present disclosure can easily be applied to other touch panel types (e.g., resistance-type touch panels) with alternate structures. In certain aspects of the present disclosure, the touch panel 830 can include transparent electrode touch sensors arranged in the X-Y direction on the surface of transparent sensor glass.

The touch panel driver can be included in the touch panel 830 for control processing related to the touch panel 830, such as scanning control. For example, the touch panel driver can scan each sensor in an electrostatic capacitance transparent electrode pattern in the X-direction and Y-direction and detect the electrostatic capacitance value of each sensor to determine when a touch operation is performed. The touch panel driver can output a coordinate and corresponding electrostatic capacitance value for each sensor. The touch panel driver can also output a sensor identifier that can be mapped to a coordinate on the touch panel display screen. Additionally, the touch panel driver and touch panel sensors can detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in an embodiment, the touch panel 830 can detect a position of a user's finger around an edge of the display panel 820 (e.g., gripping a protective case that surrounds the display/touch panel). Signals can be transmitted by the touch panel driver, e.g. in response to a detection of a touch operation, in response to a query from another element based on timed data exchange, etc.

The touch panel 830 and the display 820 can be surrounded by a protective casing, which can also enclose the other elements included in the device 800. In an embodiment, a position of the user's fingers on the protective casing (but not directly on the surface of the display 820) can be detected by the touch panel 830 sensors. Accordingly, the controller 810 can perform display control processing described herein based on the detected position of the user's fingers gripping the casing. For example, an element in an interface can be moved to a new location within the interface (e.g., closer to one or more of the fingers) based on the detected finger position.

Further, in an embodiment, the controller 810 can be configured to detect which hand is holding the device 800, based on the detected finger position. For example, the touch panel 830 sensors can detect a plurality of fingers on the left side of the device 800 (e.g., on an edge of the display 820 or on the protective casing), and detect a single finger on the right side of the device 800. In this exemplary scenario, the controller 810 can determine that the user is holding the device 800 with his/her right hand because the detected grip pattern corresponds to an expected pattern when the device 800 is held only with the right hand.

The operation key 840 can include one or more buttons or similar external control elements, which can generate an operation signal based on a detected input by the user. In addition to outputs from the touch panel 830, these operation signals can be supplied to the controller 810 for performing related processing and control. In certain aspects of the present disclosure, the processing and/or functions associated with external buttons and the like can be performed by the controller 810 in response to an input operation on the touch panel 830 display screen rather than the external button, key, etc. In this way, external buttons on the device 800 can be eliminated in lieu of performing inputs via touch operations, thereby improving watertightness.

The antenna 806 can transmit/receive electromagnetic wave signals to/from other external apparatuses, and the short-distance wireless communication processor 807 can control the wireless communication performed between the other external apparatuses. Bluetooth, IEEE 802.11, and near-field communication (NFC) are non-limiting examples of wireless communication protocols that can be used for inter-device communication via the short-distance wireless communication processor 807.

The device 800 can include a motion sensor 808. The motion sensor 808 can detect features of motion (i.e., one or more movements) of the device 800. For example, the motion sensor 808 can include an accelerometer to detect acceleration, a gyroscope to detect angular velocity, a geo-magnetic sensor to detect direction, a geo-location sensor to detect location, etc., or a combination thereof to detect motion of the device 800. In certain embodiments, the motion sensor 808 can generate a detection signal that includes data representing the detected motion. For example, the motion sensor 808 can determine a number of distinct movements in a motion (e.g., from start of the series of movements to the stop, within a predetermined time interval, etc.), a number of physical shocks on the device 800 (e.g., a jarring, hitting, etc., of the electronic device), a speed and/or acceleration of the motion (instantaneous and/or temporal), or other motion features. The detected motion features can be included in the generated detection signal. The detection signal can be transmitted, e.g., to the controller 810, whereby further processing can be performed based on data included in the detection signal. The motion sensor 808 can work in conjunction with a Global Positioning System (GPS) section 860. The information of the present position detected by the GPS section 860 is transmitted to the controller 810. An antenna 861 is connected to the GPS section 860 for receiving and transmitting signals to and from a GPS satellite.

The device 800 can include a camera section 809, which includes a lens and shutter for capturing photographs of the surroundings around the device 800. In an embodiment, the camera section 809 captures surroundings of an opposite side of the device 800 from the user. The images of the captured photographs can be displayed on the display panel 820. A memory section saves the captured photographs. The memory section can reside within the camera section 809 or it can be part of the memory 850. The camera section 809 can be a separate feature attached to the device 800 or it can be a built-in camera feature.

An example of a type of computer is shown in FIG. 9. The computer 900 can be used for the operations described in association with any of the computer-implement methods described previously, according to one implementation. For example, the computer 900 can be an example of devices 101, 102, 10n, 120, or a server, such as device 150. The computer 900 includes processing circuitry, as discussed above. The device can include other components not explicitly illustrated in FIG. 9, such as a CPU, GPU, frame buffer, etc. The processing circuitry includes one or more of the elements discussed next with reference to FIG. 9. In FIG. 9, the computer 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the computer 900. In one implementation, the memory 920 is a computer-readable medium. In one implementation, the memory 920 is a volatile memory. In another implementation, the memory 920 is a non-volatile memory.

The storage device 930 is capable of providing mass storage for the system 900. In one implementation, the storage device 930 is a computer-readable medium. In various different implementations, the storage device 930 can be a floppy disk device, a hard disk device, an optical disk device, or a tape device.

The input/output device 940 provides input/output operations for the computer 900. In one implementation, the input/output device 940 includes a keyboard and/or pointing device. In another implementation, the input/output device 940 includes a display for displaying graphical user interfaces.

Next, a hardware description of a device according to exemplary embodiments is described with reference to FIG. 10. In FIG. 10, the device, which can be the above-described devices of FIG. 1, includes processing circuitry, as discussed above. The processing circuitry includes one or more of the elements discussed next with reference to FIG. 10. The device may include other components not explicitly illustrated in FIG. 10, such as a CPU, GPU, frame buffer, etc. In FIG. 10, the device/server includes a CPU 1000 which performs the processes described above/below. The process data and instructions can be stored in memory 1002. These processes and instructions can also be stored on a storage medium disk 1004 such as a hard drive (HDD) or portable storage medium or can be stored remotely. Further, the claimed advancements are not limited by the form of the computer-readable media on which the instructions of the inventive process are stored. For example, the instructions can be stored on CDs, DVDs, in FLASH memory, RAM, ROM, PROM, EPROM, EEPROM, hard disk or any other information processing device with which the device communicates, such as a server or computer.

Further, the claimed advancements can be provided as a utility application, background daemon, or component of an operating system, or combination thereof, executing in conjunction with CPU 1000 and an operating system such as Microsoft Windows, UNIX, Solaris, LINUX, Apple MAC-OS and other systems known to those skilled in the art.

The hardware elements in order to achieve the device can be realized by various circuitry elements, known to those skilled in the art. For example, CPU 1000 can be a Xenon or Core processor from Intel of America or an Opteron processor from AMD of America, or can be other processor types that would be recognized by one of ordinary skill in the art. Alternatively, the CPU 1000 can be implemented on an FPGA, ASIC, PLD or using discrete logic circuits, as one of ordinary skill in the art would recognize. Further, CPU 1000 can be implemented as multiple processors cooperatively working in parallel to perform the instructions of the processes described above. CPU 1000 can be an example of the CPU illustrated in each of the devices of FIG. 1.

The device in FIG. 10 also includes a network controller 1006, such as an Intel Ethernet PRO network interface card from Intel Corporation of America, for interfacing with network 1050 (also shown in FIG. 1 as 150). As can be appreciated, the network 1050 can be a public network, such as the Internet, or a private network such as an LAN or WAN network, or any combination thereof and can also include PSTN or ISDN sub-networks. The network 1050 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device further includes a display controller 1008, such as a NVIDIA GeForce GTX or Quadro graphics adaptor from NVIDIA Corporation of America for interfacing with display 1010, such as an LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners.

A sound controller 1020 is also provided in the device to interface with speakers/microphone 1022 thereby providing sounds and/or music.

The general purpose storage controller 1024 connects the storage medium disk 1004 with communication bus 1026, which can be an ISA, EISA, VESA, PCI, or similar, for interconnecting all of the components of the device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

Figure 11:
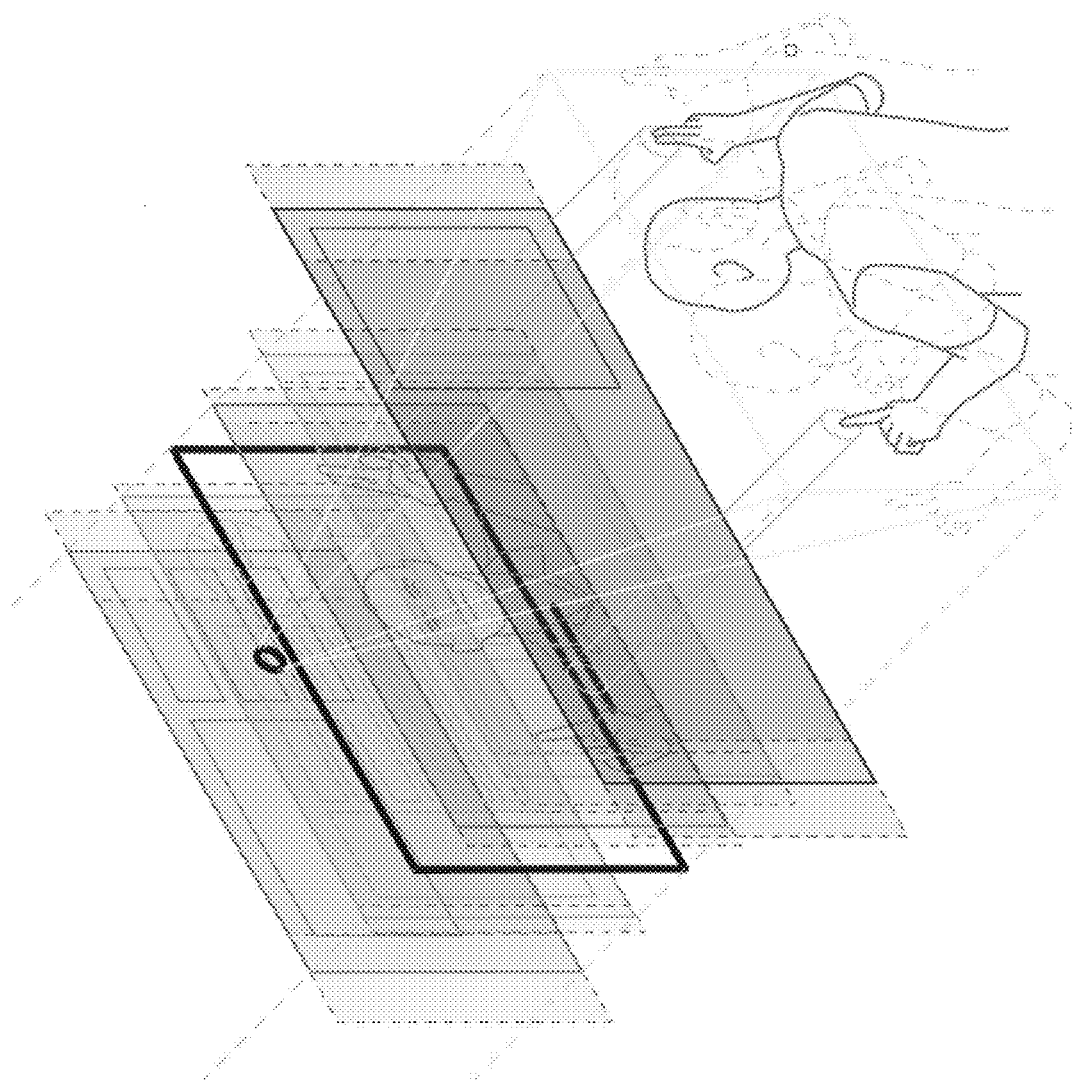
FIG. 11 is an example of Transparent Computing.

As shown in FIG. 11, in some embodiments, one or more of the disclosed functions and capabilities may be used to enable a volumetric composite of content-activated layers of Transparent Computing, content-agnostic layers of Transparent Computing and/or camera-captured layers of Transparent Computing placed visibly behind 2-dimensional or 3-dimensional content displayed on screens, placed in front of 2-dimensional or 3-dimensional content displayed on screens, placed inside of 3-dimensional content displayed on screens and/or placed virtually outside of the display of screens. Users can interact via Touchless Computing with any layer in a volumetric composite of layers of Transparent Computing wherein a user's gaze, gestures, movements, position, orientation, or other characteristics observed by a camera are used as the basis for selecting and interacting with objects in any layer in the volumetric composite of layers of Transparent Computing to execute processes on computing devices.

In some embodiments, one or more of the disclosed functions and capabilities may be used to enable users to see a volumetric composite of layers of Transparent Computing from a 360-degree Optical Lenticular Perspective wherein a user's gaze, gestures, movements, position, orientation, or other characteristics observed by cameras are a basis to calculate, derive and/or predict the 360-degree Optical Lenticular Perspective from which users see the volumetric composite of layers of Transparent Computing displayed on screens. Further, users can engage with a 3-dimensional virtual environment displayed on screens consisting of layers of Transparent Computing placed behind the 3-dimensional virtual environment displayed on screens, placed in front of a 3-dimensional virtual environment displayed on screens, and/or placed inside of the a 3-dimensional virtual environment displayed on screens wherein users can select and interact with objects in any layer of Transparent Computing to execute processes on computing devices while looking at the combination of the 3-dimensional virtual environment and the volumetric composite of layers of Transparent Computing from any angle of the 360-degree Optical Lenticular Perspective available to users.

While this specification contains many specific implementation details, these should not be construed as limitations on the scope of what can be claimed, but rather as descriptions of features that can be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

Embodiments of the present disclosure may also be as set forth in the following parentheticals.

(1) 1. An apparatus, comprising processing circuitry, including a graphics processing unit (GPU), configured to establish a video connection between the apparatus and a first device, the first device associated with a user, in response to establishing the video connection, transmit a token to a second device equipped with a display, the second device also associated with the user, the token being displayed on the display of the second device, receive visual data comprising the token displayed on the display of the second device, the visual data being generated by the first device, that includes a camera, capturing the token displayed on the display of the second device, access a frame buffer of the GPU, analyze, in the frame buffer of the GPU, a frame representing a section of the visual data to detect the token, and in response to the token being detected in the visual data, generate an authentication to authenticate the video connection between the apparatus and the first device.

(2) The apparatus of (1), wherein the token encodes a unique identifier in at least one of a pattern, a shape, pixel arrangement, pixel luma, and pixel chroma.

(3) The apparatus of any one of (1) to (2), wherein the processing circuitry analyzes the visual data by detecting physical objects in proximity to the second device which are present in the visual data and captured by the camera of the first device to supplement generation of the authentication.

(4) The apparatus of any one of (1) to (3), wherein the processing circuitry analyzes the visual data by detecting a face of the user visible together with the token to supplement generation of the authentication.

(5) The apparatus of any one of (1) to (4), wherein the processing circuitry analyzes the visual data by detecting a face of the user visible together with the token as well as physical objects in proximity to the second device which are present in the visual data and captured by the camera of the first device to supplement generation of the authentication.

(6) The apparatus of any one of (1) to (5), wherein the processing circuitry is configured to, in response to the token not being detected in the visual data, terminate the video connection between the apparatus and the first device.

(7) The apparatus of any one of (1) to (6), wherein the first device corresponds to a desktop computer and the second device corresponds to a mobile device.

(8) A method, comprising establishing a video connection between an apparatus and a first device, the first device associated with a user, in response to establishing the video connection, transmitting a token to a second device equipped with a display, the second device also associated with the user, the token being displayed on the display of the second device, receiving visual data comprising the token displayed on the display of the second device, the visual data being generated by the first device, that includes a camera, capturing the token displayed on the display of the second device, accessing a frame buffer of a graphics processing unit (GPU), analyzing, in the frame buffer of the GPU, a frame representing a section of the visual data to detect the token, and in response to the token being detected in the visual data, generating an authentication to authenticate the video connection between the apparatus and the first device.

(9) The method of (8), wherein the token encodes a unique identifier in at least one of a pattern, a shape, pixel arrangement, pixel luma, and pixel chroma.

(10) The method of any one of (8) to (9), wherein the analyzing of the visual data further comprises detecting physical objects in proximity to the second device which are present in the visual data and captured by the camera of the first device to supplement generation of the authentication.

(11) The method of any one of (8) to (10), wherein the analyzing of the visual data further comprises detecting a face of the user visible together with the token to supplement generation of the authentication.

(12) The method of any one of (8) to (11), wherein the analyzing of the visual data further comprises detecting a face of the user visible together with the token as well as physical objects in proximity to the second device which are present in the visual data and captured by the camera of the first device to supplement generation of the authentication.

(13) The method of any one of (8) to (12), further comprising in response to the token not being detected in the visual data, terminating the video connection between the apparatus and the first device.

(14) The method of any one of (8) to (13), wherein the first device corresponds to a desktop computer and the second device corresponds to a mobile device.

(15) A non-transitory computer-readable storage medium for storing computer-readable instructions that, when executed by a computer, cause the computer to perform a method, the method comprising establishing a video connection between an apparatus and a first device, the first device associated with a user, in response to establishing the video connection, transmitting a token to a second device equipped with a display, the second device also associated with the user, the token being displayed on the display of the second device, receiving visual data comprising the token displayed on the display of the second device, the visual data being generated by the first device, that includes a camera, capturing the token displayed on the display of the second device, accessing a frame buffer of a graphics processing unit (GPU), analyzing, in the frame buffer of the GPU, a frame representing a section of the visual data to detect the token, and in response to the token being detected in the visual data, generating an authentication to authenticate the video connection between the apparatus and the first device.

(16) The non-transitory computer-readable storage medium of (15), wherein the token encodes a unique identifier in at least one of a pattern, a shape, pixel arrangement, pixel luma, and pixel chroma.

(17) The non-transitory computer-readable storage medium of any one of (15) to (16), wherein the analyzing of the visual data further comprises detecting physical objects in proximity to the second device which are present in the visual data and captured by the camera of the first device to supplement generation of the authentication.

(18) The non-transitory computer-readable storage medium of any one of (15) to (17), wherein the analyzing of the visual data further comprises detecting a face of the user visible together with the token to supplement generation of the authentication.

(19) The non-transitory computer-readable storage medium of any one of (15) to (18), wherein the analyzing of the visual data further comprises detecting a face of the user visible together with the token as well as physical objects in proximity to the second device which are present in the visual data and captured by the camera of the first device to supplement generation of the authentication.

(20) The non-transitory computer-readable storage medium of any one of (15) to (19), further comprising in response to the token not being detected in the visual data, terminating the video connection between the apparatus and the first device.

Thus, the foregoing discussion discloses and describes merely exemplary embodiments of the present disclosure. It should be understood that the present disclosure can be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. An apparatus, comprising:
  processing circuitry, including a graphics processing unit (GPU), configured to
    establish a video connection between the apparatus and a first device, the first device associated with a user,
    in response to establishing the video connection, transmit a token to a second device equipped with a display, the second device also associated with the user, the token being displayed on the display of the second device,
    receive visual data comprising the token displayed on the display of the second device, the visual data being generated by the first device, that includes a camera, capturing the token displayed on the display of the second device,
    access a frame buffer of the GPU,
    detect the token, in the frame buffer of the GPU, by analyzing a frame representing a section of the visual data, and
    in response to the token being detected in the visual data, generate an authentication to authenticate the video connection between the apparatus and the first device.

2. The apparatus of claim 1, wherein the token includes visual information or a unique identifier in at least one of a pattern, a shape, pixel arrangement, pixel luma, and pixel chroma.

3. The apparatus of claim 1, wherein the processing circuitry analyzes the visual data by detecting physical objects in proximity to the second device which are present in the visual data and captured by the camera of the first device to supplement generation of the authentication.

4. The apparatus of claim 1, wherein the processing circuitry analyzes the visual data by detecting a face of the user visible together with the token to supplement generation of the authentication.

5. The apparatus of claim 1, wherein the processing circuitry analyzes the visual data by detecting a face of the user visible together with the token as well as physical objects in proximity to the second device which are present in the visual data and captured by the camera of the first device to supplement generation of the authentication.

6. The apparatus of claim 1, wherein the first device corresponds to a desktop computer and the second device corresponds to a mobile device.

7. A method, comprising:
establishing a video connection between an apparatus and a first device, the first device associated with a user;
in response to establishing the video connection, transmitting a token to a second device equipped with a display, the second device also associated with the user, the token being displayed on the display of the second device;
receiving visual data comprising the token displayed on the display of the second device, the visual data being generated by the first device, that includes a camera, capturing the token displayed on the display of the second device;
accessing a frame buffer of a graphics processing unit (GPU);
detecting the token in the frame buffer of the GPU, by analyzing a frame representing a section of the visual data; and
in response to the token being detected in the visual data, generating an authentication to authenticate the video connection between the apparatus and the first device.

8. The method of claim 7, wherein the token includes visual information or a unique identifier in at least one of a pattern, a shape, pixel arrangement, pixel luma, and pixel chroma.

9. The method of claim 7, wherein the analyzing of the visual data further comprises detecting physical objects in proximity to the second device which are present in the visual data and captured by the camera of the first device to supplement generation of the authentication.

10. The method of claim 7, wherein the analyzing of the visual data further comprises detecting a face of the user visible together with the token to supplement generation of the authentication.

11. The method of claim 7, wherein the analyzing of the visual data further comprises detecting a face of the user visible together with the token as well as physical objects in proximity to the second device which are present in the visual data and captured by the camera of the first device to supplement generation of the authentication.

12. The method of claim 7, wherein the first device corresponds to a desktop computer and the second device corresponds to a mobile device.

13. A non-transitory computer-readable storage medium for storing computer-readable instructions that, when executed by a computer, cause the computer to perform a method, the method comprising:
establishing a video connection between an apparatus and a first device, the first device associated with a user;
in response to establishing the video connection, transmitting a token to a second device equipped with a display, the second device also associated with the user, the token being displayed on the display of the second device;
receiving visual data comprising the token displayed on the display of the second device, the visual data being generated by the first device, that includes a camera, capturing the token displayed on the display of the second device;
accessing a frame buffer of a graphics processing unit (GPU);
detecting the token in the frame buffer of the GPU, by analyzing a frame representing a section of the visual data; and
in response to the token being detected in the visual data, generating an authentication to authenticate the video connection between the apparatus and the first device.

14. The non-transitory computer-readable storage medium of claim 13, wherein the token includes visual information or a unique identifier in at least one of a pattern, a shape, pixel arrangement, pixel luma, and pixel chroma.

15. The non-transitory computer-readable storage medium of claim 13, wherein the analyzing of the visual data further comprises detecting physical objects in proximity to the second device which are present in the visual data and captured by the camera of the first device to supplement generation of the authentication.

16. The non-transitory computer-readable storage medium of claim 13, wherein the analyzing of the visual data further comprises detecting a face of the user visible together with the token to supplement generation of the authentication.

17. The non-transitory computer-readable storage medium of claim 13, wherein the analyzing of the visual data further comprises detecting a face of the user visible together with the token as well as physical objects in proximity to the second device which are present in the visual data and captured by the camera of the first device to supplement generation of the authentication.

* * * * *